(12) United States Patent
Leone et al.

(10) Patent No.: US 11,650,064 B2
(45) Date of Patent: May 16, 2023

(54) SYSTEMS AND METHODS FOR FUEL PURCHASE DECISION ASSISTANCE

(71) Applicant: Ford Global Technologies, LLC, Dearborn, MI (US)

(72) Inventors: Thomas G. Leone, Ypsilanti, MI (US); James Eric Anderson, Dearborn, MI (US); Michael Kruntovski, Beverly Hills, MI (US); Chad Boarman, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 16/438,357

(22) Filed: Jun. 11, 2019

(65) Prior Publication Data
US 2020/0393258 A1 Dec. 17, 2020

(51) Int. Cl.
G01C 21/34 (2006.01)
G01C 21/36 (2006.01)
G06Q 50/30 (2012.01)
G07C 5/08 (2006.01)

(52) U.S. Cl.
CPC ..... *G01C 21/3469* (2013.01); *G01C 21/3438* (2013.01); *G01C 21/3492* (2013.01); *G01C 21/3697* (2013.01); *G06Q 50/30* (2013.01); *G07C 5/0816* (2013.01)

(58) Field of Classification Search
None
See application file for complete search history.

(56) References Cited

U.S. PATENT DOCUMENTS

| 8,751,140 | B2 | 6/2014 | Surnilla et al. |
| 9,243,929 | B2 | 1/2016 | Burlingham et al. |
| 10,042,359 | B1* | 8/2018 | Konrardy ................. B60P 3/12 |
| 10,329,137 | B1* | 6/2019 | Prasad .................... G07F 9/002 |
| 11,068,811 | B2* | 7/2021 | Camp .................... G06Q 10/06 |
| 2007/0227493 | A1* | 10/2007 | Cheiky ................. F02M 27/02 |
| | | | 123/304 |
| 2011/0137470 | A1* | 6/2011 | Surnilla ................. G01C 21/26 |
| | | | 700/282 |

(Continued)

OTHER PUBLICATIONS

"Selecting the Right Octane Fuel," Mar. 5, 2015, www.fueleconomy. gov, <https://web.archive.org/web/20150305120837/https://www. fueleconomy.gov/feg/octane.shtml> (Year: 2015).*

(Continued)

*Primary Examiner* — Aniss Chad
*Assistant Examiner* — Madison R Hughes
(74) *Attorney, Agent, or Firm* — Vincent Mastrogiacomo McCoy Russell LLP

(57) ABSTRACT

Methods and systems are provided for improving the manner in which different fuel types are used under different driving scenarios. In one example, a method may include determining a travel route based on a particular transportation request input by a customer into a software application, where the software application selects a vehicle from a plurality of available vehicles to fulfill the transportation request based on a relative fuel octane content of fuel stored by the available vehicles. In this way, appropriate fuel type usage for different driving scenarios may be improved, and non-appropriate fuel type usage may be avoided.

18 Claims, 9 Drawing Sheets

(56) References Cited

U.S. PATENT DOCUMENTS

| | | | | |
|---|---|---|---|---|
| 2011/0238457 A1* | 9/2011 | Mason | ............... | G01C 21/3469 |
| | | | | 705/7.14 |
| 2011/0288738 A1* | 11/2011 | Donnelly | ............ | F02D 19/0665 |
| | | | | 701/99 |
| 2011/0301997 A1* | 12/2011 | Gale | ................ | G06Q 10/06316 |
| | | | | 705/7.26 |
| 2016/0290265 A1* | 10/2016 | Gabriel | ................. | F02P 5/1527 |
| 2017/0262790 A1* | 9/2017 | Khasis | ................. | G08G 1/0116 |
| 2017/0287237 A1* | 10/2017 | Koenig | ................. | G07C 5/008 |
| 2017/0316379 A1* | 11/2017 | Lepek | .................... | G06Q 10/08 |
| 2019/0179964 A1* | 6/2019 | Newell | ................. | G06F 16/252 |
| 2019/0228375 A1* | 7/2019 | Laury | ................. | G05D 1/0088 |

OTHER PUBLICATIONS

"AAA Premium Fuel Research, Phase II: Proprietary research into the use of premium octane gasoline when recommended, but not required, by the manufacturer," AAA Website, Retrieved Aug. 22, 2019 at https://newsroom.aaa.com/wp-content/uploads/2017/12/Premium-Fuel-Phase-II-Research-Report-FINAL-2.pdf, Available as Early as Nov. 2017, 68 pages.

\* cited by examiner

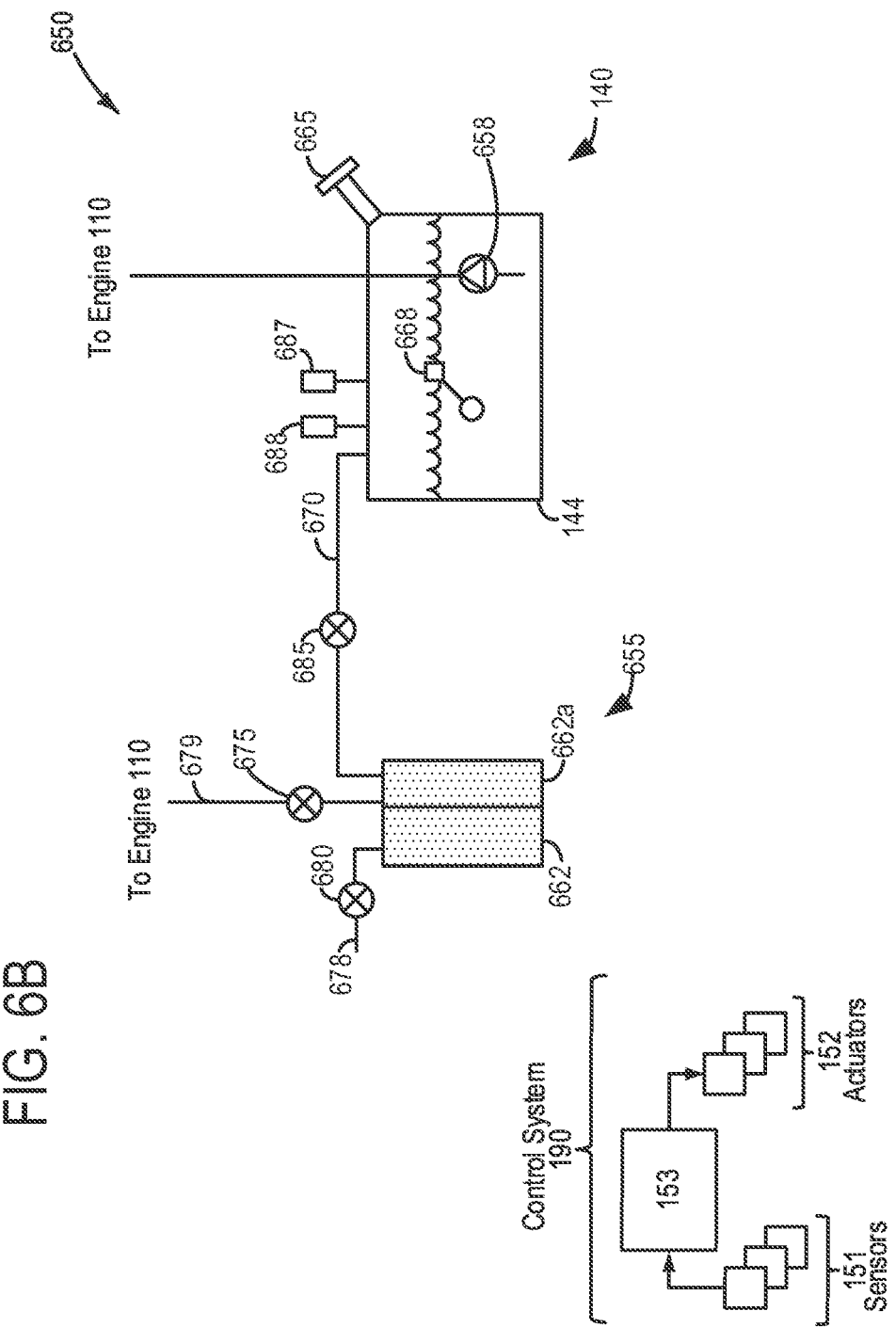

SYSTEMS AND METHODS FOR FUEL PURCHASE DECISION ASSISTANCE

FIELD

The present description relates generally to systems and methods for coordinating vehicle travel routes with fuel type to improve fuel usage and vehicle performance.

BACKGROUND/SUMMARY

Ride-hailing, ride-sharing, and vehicle-sharing services have contributed greatly to a changing transportation landscape in recent years. Such services are referred to broadly as vehicle-for-hire services. Prior to such services, fuel purchase decisions were largely up to an owner of a vehicle, based on factors such as vehicle manufacturer specified fuel type, price, personal preference, etc. Now, however, decisions with regard to fuel purchase may not always be intuitive. For example, a customer using a car-sharing service may not necessarily know which choice of fuel may be optimal for a particular vehicle and/or particular travel route, under circumstances where such a customer needs to refuel the particular vehicle. In another related example, a vehicle operator for a ride-hailing service may not intuitively know which type of fuel may be better suited for various driving conditions and travel routes requested by customers utilizing the ride-hailing service. Non-optimal fuel choice may in some examples contribute to one or more of engine degradation, reduced fuel economy, degraded vehicle performance, increased emissions, etc. Such issues are not limited to vehicle-for-hire services, but may additionally apply to delivery vehicles.

The inventors herein have recognized the above-mentioned issues and have developed systems and methods to address the above-mentioned issues. In one example, a method comprises receiving a transportation request and determining a travel route pertaining to the transportation request. The method may include selecting a vehicle from a plurality of available vehicles to provide the transportation request based on a relative fuel octane content of fuel stored by the available vehicles. In this way, higher octane fuel may be more appropriately used for more demanding travel routes while lower octane fuel may be more appropriately used for less demanding travel routes. Such pairing of vehicles with travel routes based on fuel type may improve vehicle performance, may reduce emissions, may improve fuel economy and may reduce overall engine degradation of vehicles that make up the fleet. Further advantages include avoiding use of higher cost fuel under circumstances where no substantial benefit of the use of the higher cost fuel may be realized.

In one example, the method may include determining a target fuel octane content for the travel route based on the transportation request. For example, based on the transportation request a cargo load may be determined, which may be used to determine the target fuel octane content for the travel route. Additionally or alternatively, based on the transportation request an altitude increase for the travel route may be determined, which may be used to determine the target fuel octane content for the travel route. By determining the target fuel octane content for the travel route, an appropriate vehicle may be selected from the plurality of available vehicles.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6B depicts an example fuel system and evaporative emissions system for use in the vehicle propulsion system of FIG. 1 or FIG. 6A.

DETAILED DESCRIPTION

Figure 2:
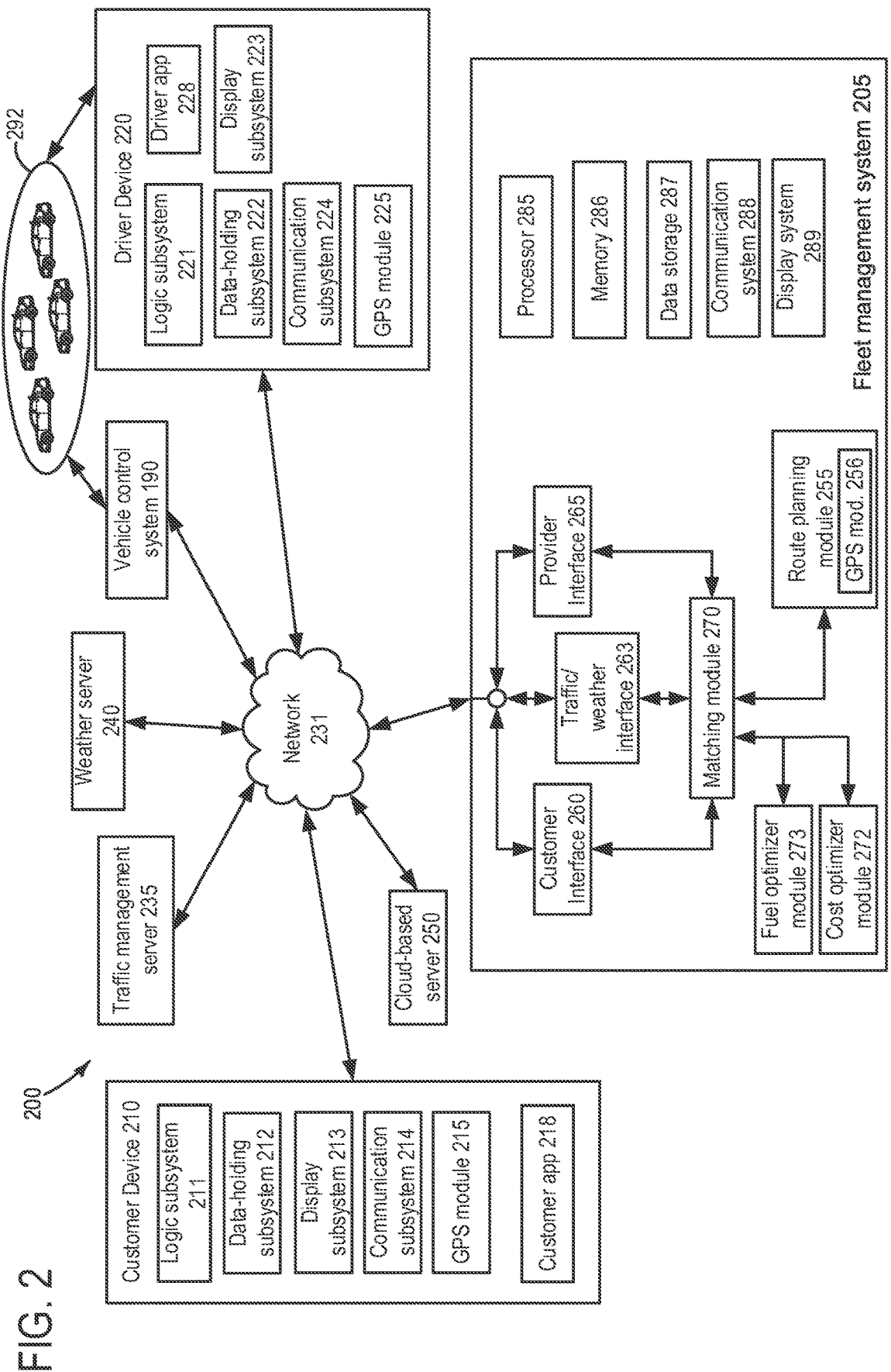
FIG. 2 shows a transportation facilitation system for use in managing a fleet of vehicles.
Figure 3:
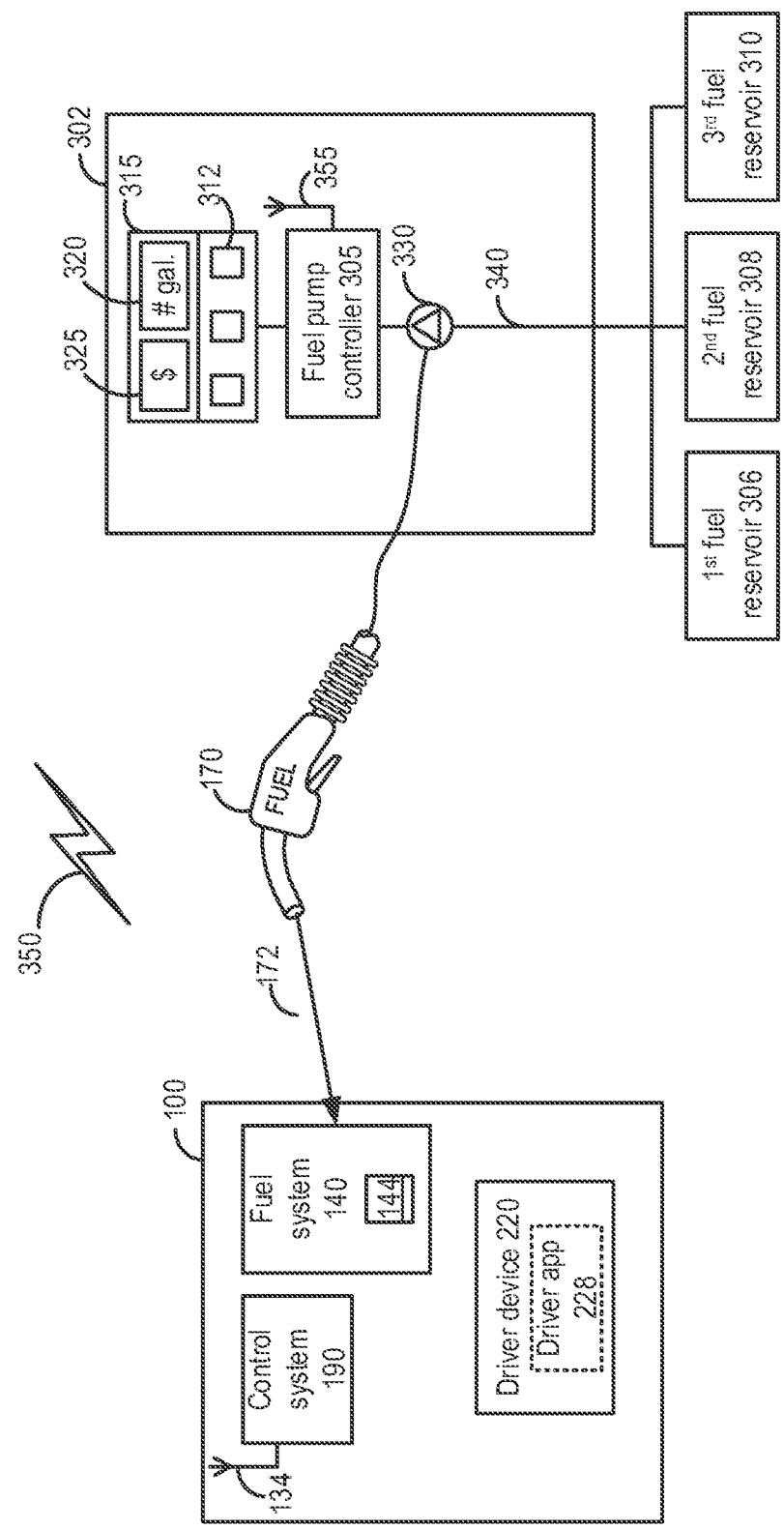
FIG. 3 depicts an example block diagram illustrating a smart refueling system.
Figure 4:
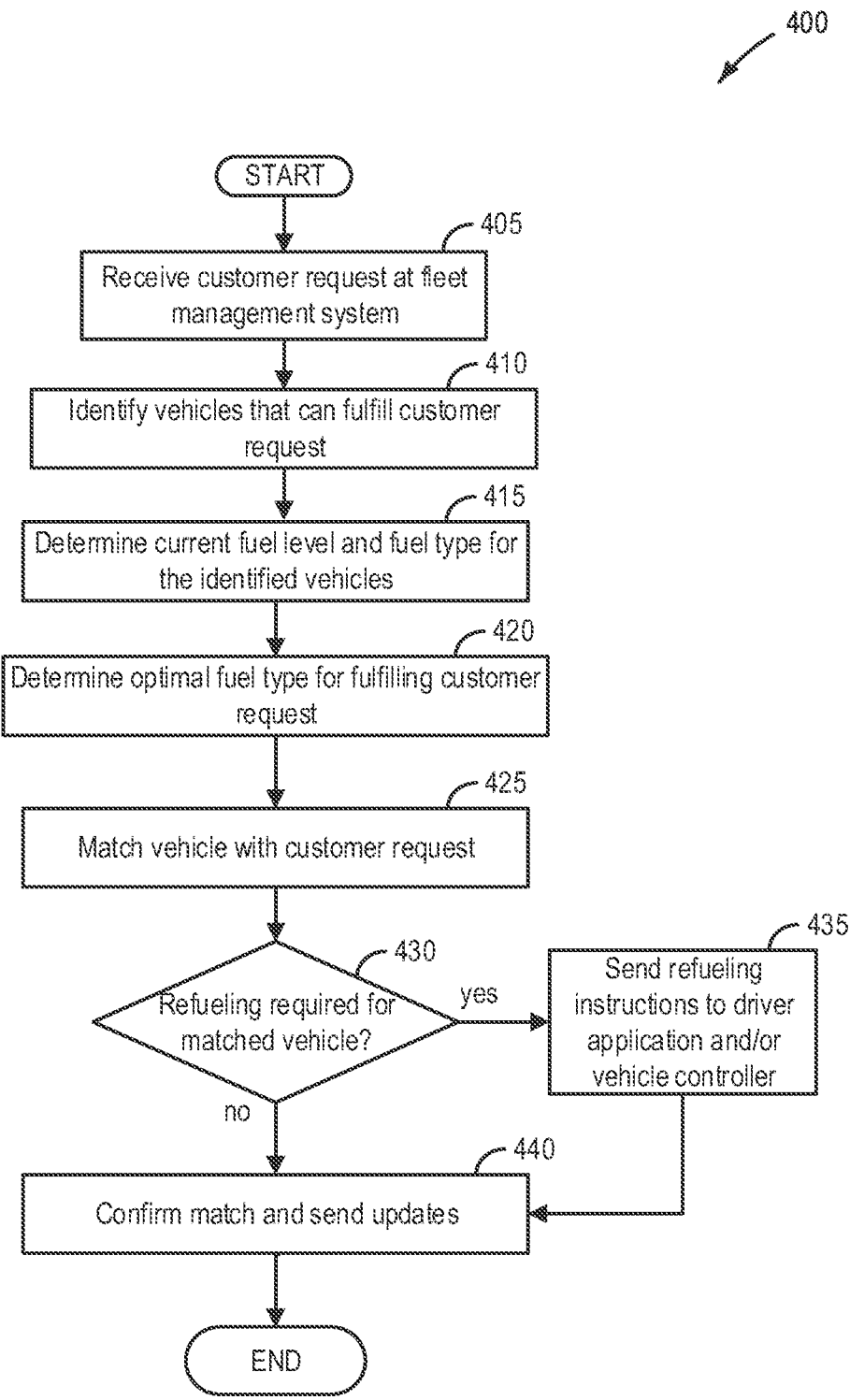
FIG. 4 depicts a high-level example method for management of a fleet of vehicles taking into account fuel type in terms of various transportation requests.
Figure 5:
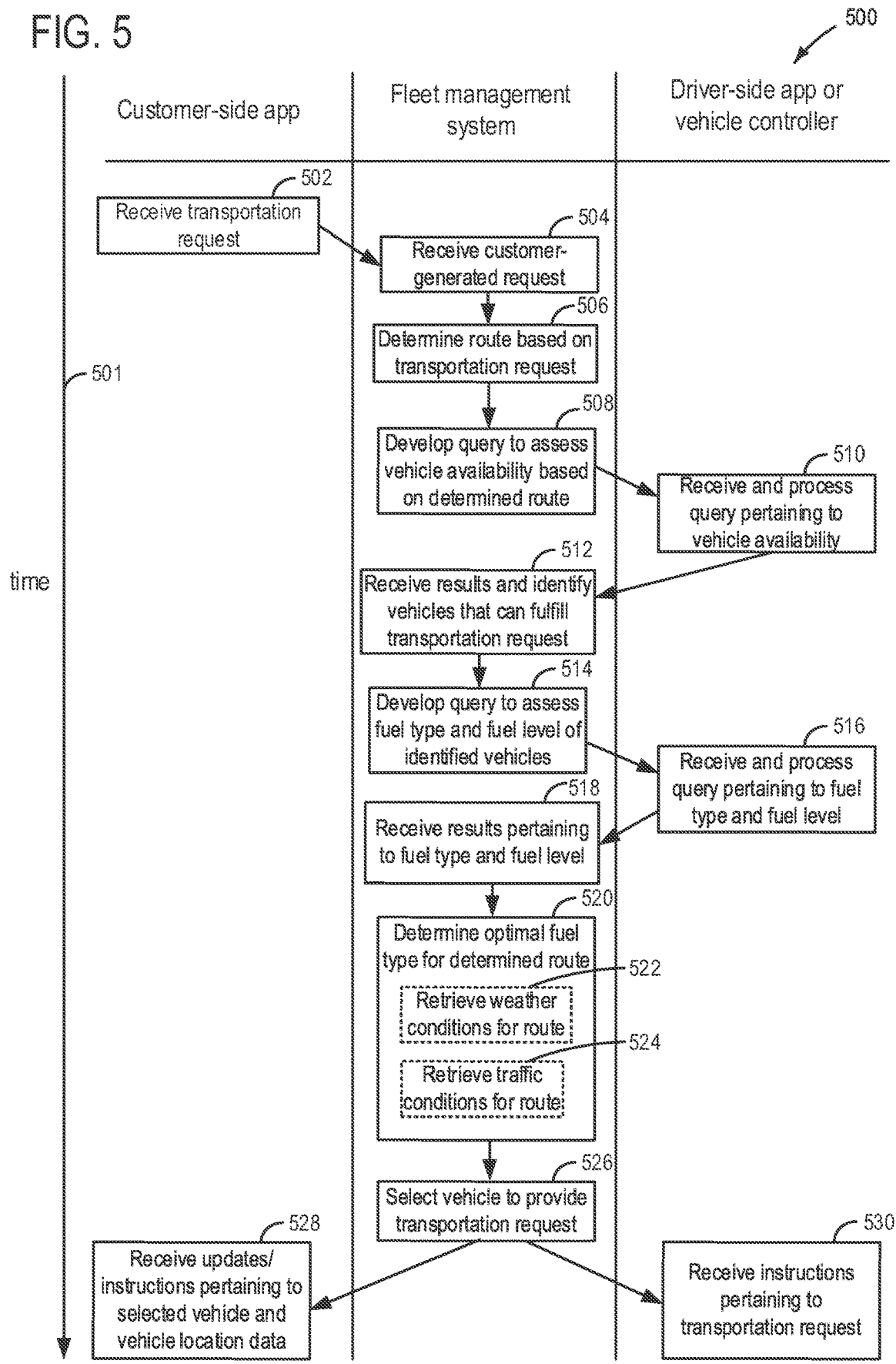
FIG. 5 depicts an example communication timeline for conducting the method of FIG. 4.
Figure 6A:
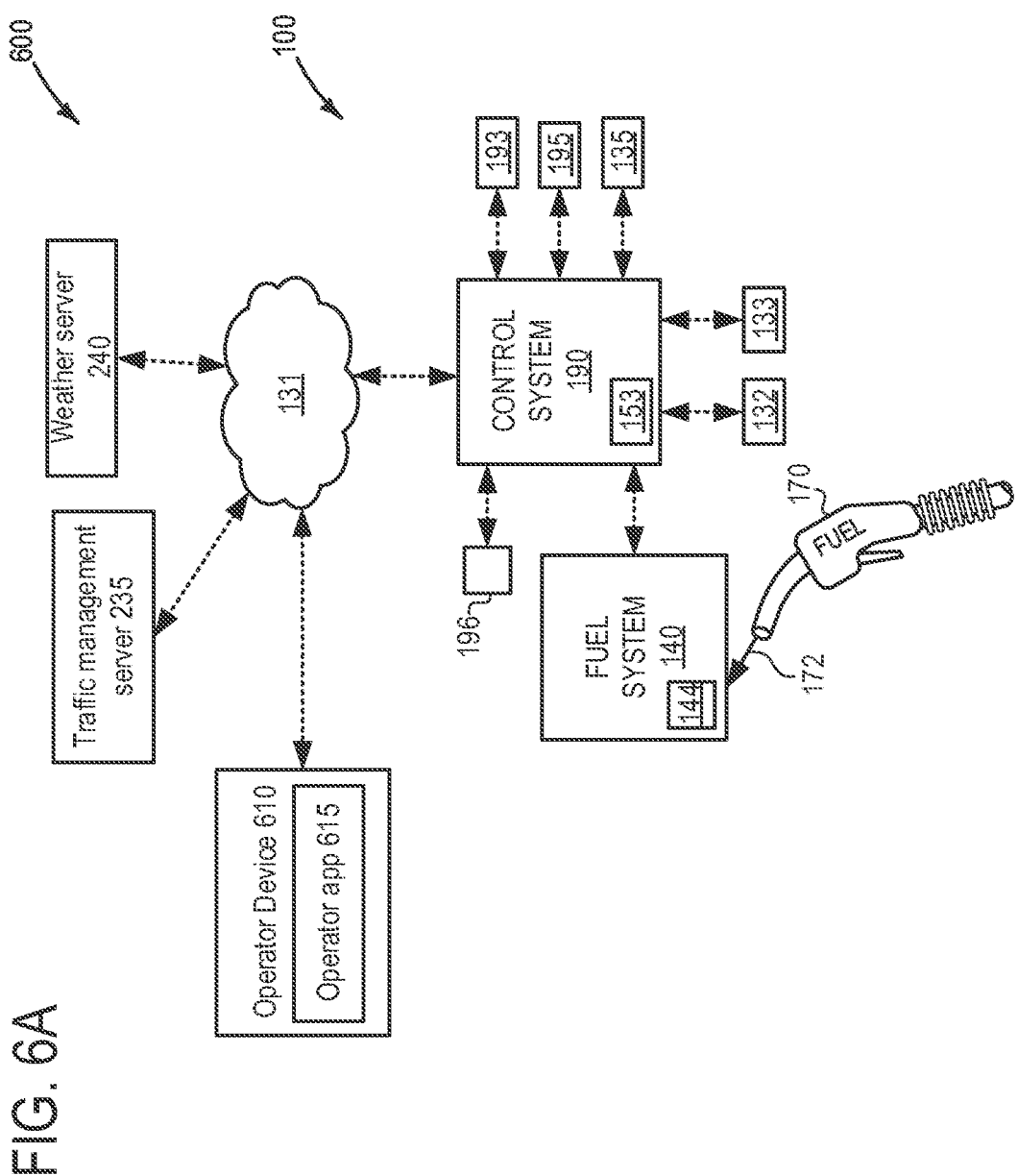
FIG. 6A depicts an example transportation system that includes a simplified representation of the vehicle propulsion system of FIG. 1.
Figure 7:
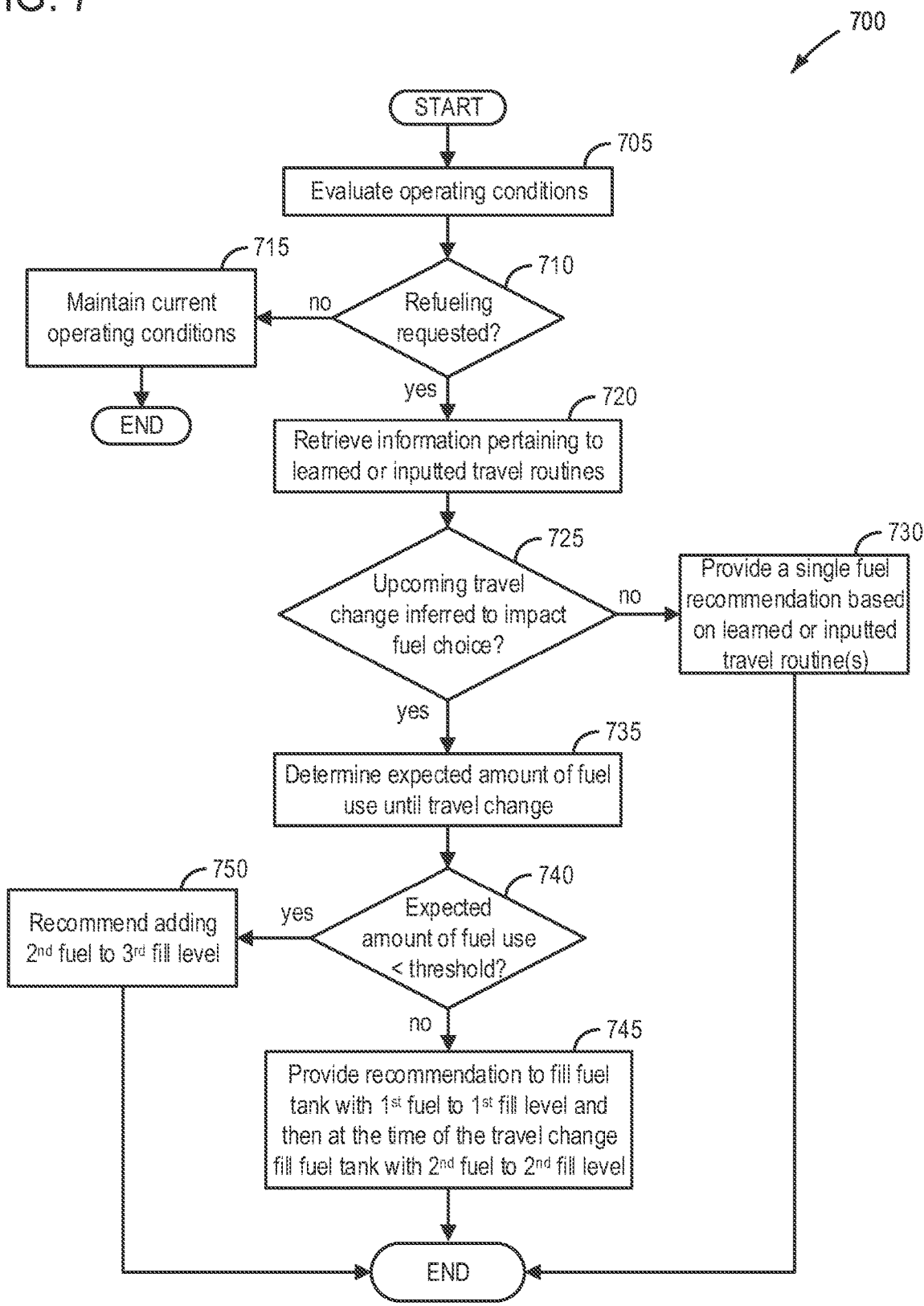
FIG. 7 depicts a high-level example method for providing a refueling recommendation based on a predicted or inferred upcoming travel change.
Figure 8:
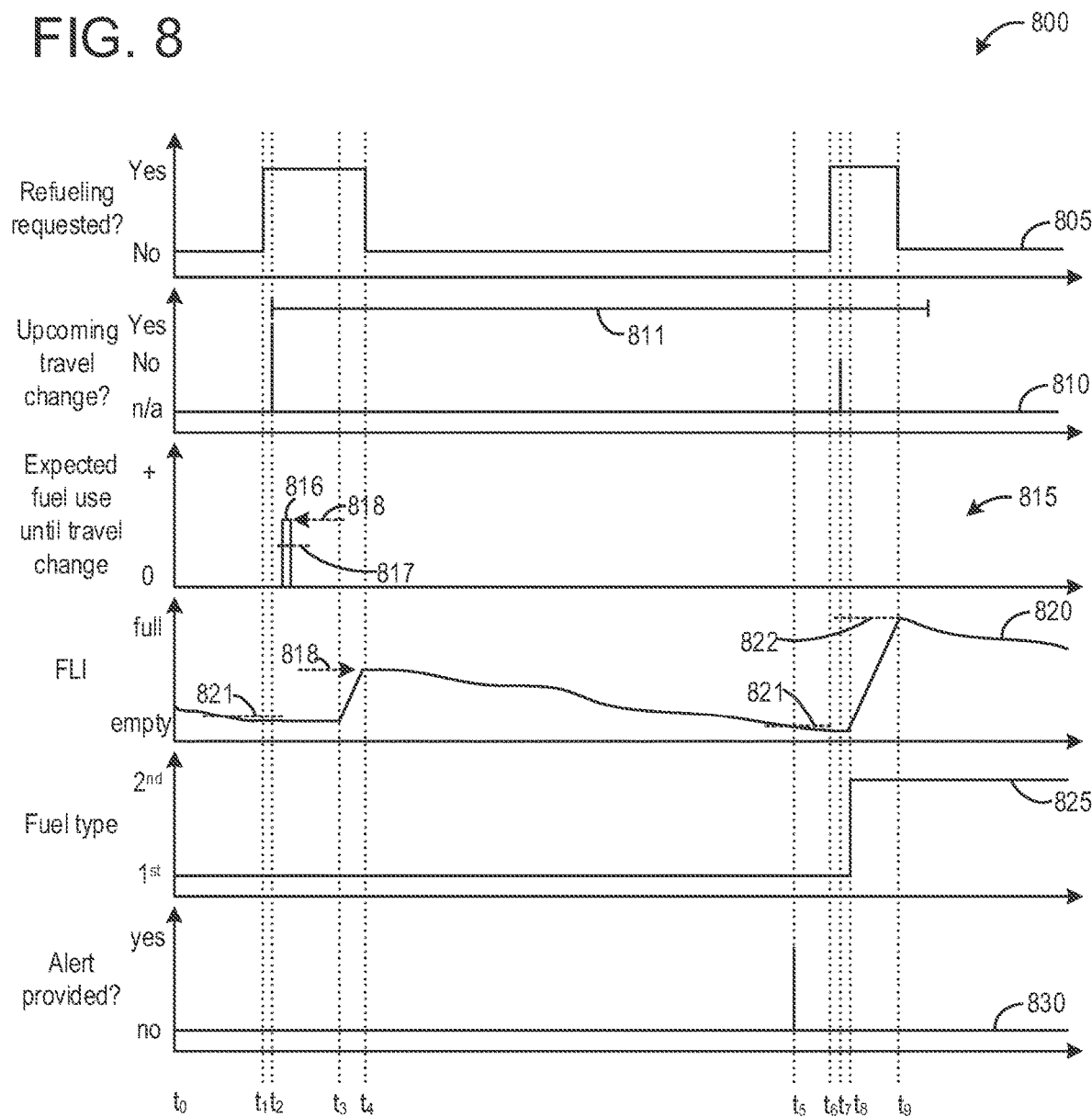
FIG. 8 depicts an example timeline depicting how the method of FIG. 7 is used to provide a refueling recommendation.

The following description relates to systems and methods for optimizing fuel use as a function of predicted or inferred travel routes. The disclosure pertains to vehicle propulsion systems, or simply vehicles, such as the vehicle propulsion system of FIG. 1. In one example, such exemplary vehicles may be included in a fleet of vehicles, where the fleet of vehicles is managed by a fleet management system, as depicted at FIG. 2. The fleet management system may be used to coordinate customer transportation requests with available vehicles, where such coordination may account for fuel type when pairing an available vehicle with a transportation request. The vehicles included in such a fleet may be driven by vehicle operators or drivers in one example, or may be autonomously operated in other examples. At some point, such vehicles may have to be refueled, and instructions for refueling may be provided by the fleet management system to either a vehicle controller or a remote computing device (e.g. computing device used by the customer or a driver of the vehicle). In some examples, such refueling instructions may be wirelessly communicated from either the vehicle controller or the remote device to a smart fueling system for refueling a particular vehicle, as depicted at FIG. 3, which may prevent fuel choice errors. A method whereby the fleet management system may coordinate transportation requests with available vehicles based at least in part on fuel type is depicted at FIG. 4. FIG. 5 depicts a communication timeline illustrating how the fleet management receives transportation requests and coordinates vehicles for fulfilling the transportation requests. In other examples, coordinating fuel type with particular travel routes may be carried out for vehicles that are not part of a fleet. In such an example, rather than relying on the fleet management system, learned or driver-inputted information pertaining to travel routes or travel plans may be processed by a vehicle controller, which may then provide suggested fuel types for particular travel plans. Accordingly, a vehicle transportation system that is not part of a fleet is depicted at FIG. 6A. FIG. 6B depicts an example fuel system and evaporative emissions system for vehicles of the present disclosure. FIG. 7 depicts an example method used by a vehicle controller to recommend a particular fuel type for particular travel routes. An example timeline illustrating how the method of FIG. 7 provides recommended fuel types for particular travel routes is depicted at FIG. 8.

Figure 1:
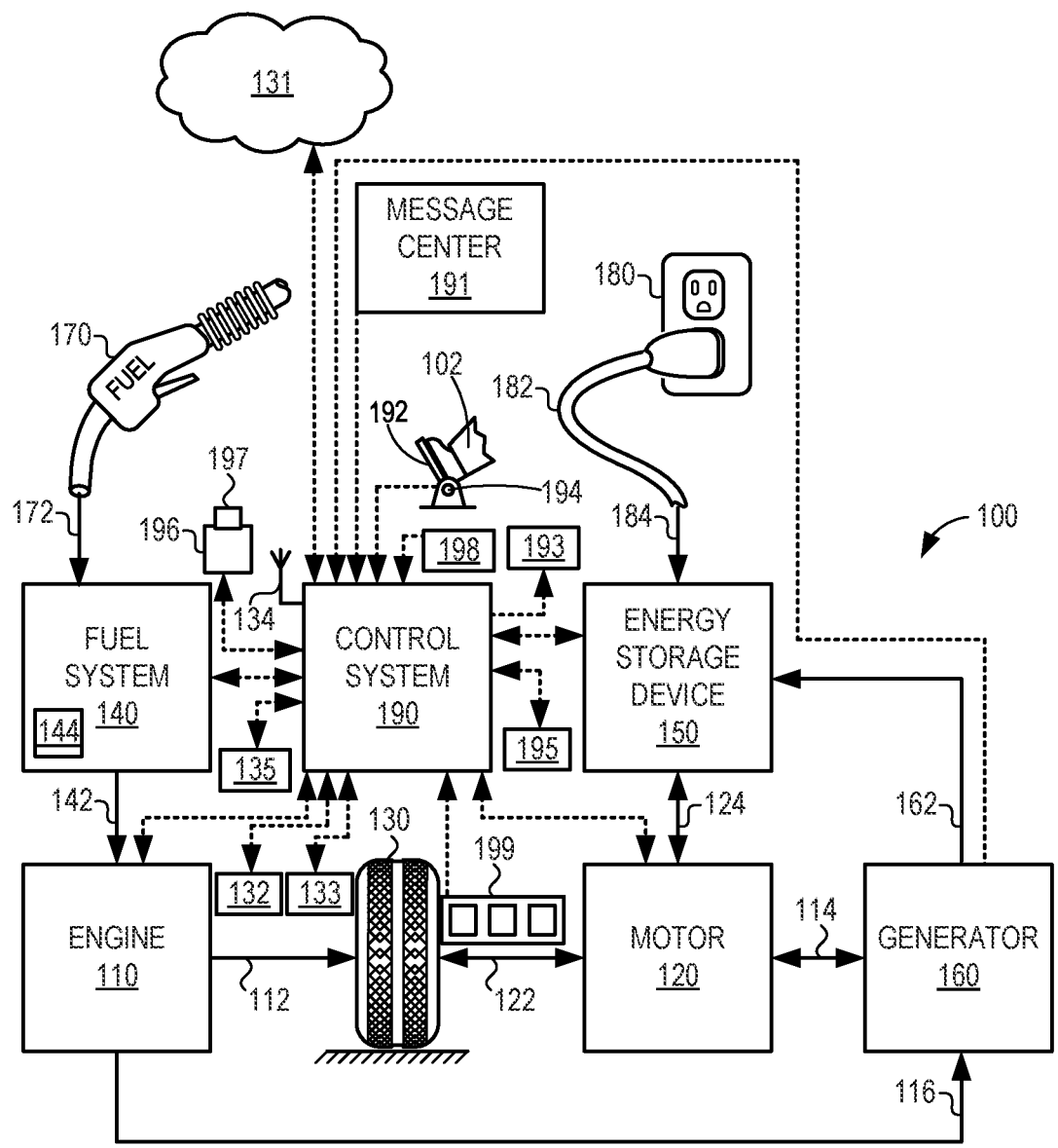
FIG. 1 shows a high-level block diagram illustrating an example vehicle propulsion system.
Figure 1:
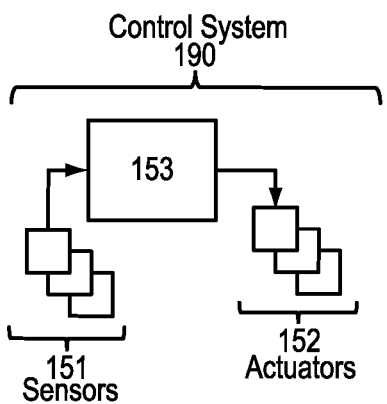

Turning now to the figures, FIG. 1 illustrates an example vehicle propulsion system 100 for use with the systems and methods of the present disclosure. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). However, while vehicle propulsion system 100 is depicted as a HEV, it may be understood that in other examples vehicle propulsion system 100 may not be a HEV, without departing from the scope of this disclosure.

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include a fuel tank 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

As depicted, controller 153 may comprise a portion of a control system 190. Controller 153 is shown receiving information from a plurality of sensors 151 and sending control signals to a plurality of actuators 152.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise wireless network, a short-range wireless network, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle (or autonomous controller) may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Accordingly, a vehicle wireless communication device 134 is depicted as coupled to control system 190. Information received from the GPS may be cross-referenced to information available via the internet to determine local weather conditions, local vehicle regulations, etc. In some examples, vehicle system 100 may include one or more of lasers, onboard cameras, radar, sonar, and/or acoustic sensors 133, which may enable vehicle location, traffic information, etc., to be collected via the vehicle.

In some examples vehicle propulsion system 100 may be operated autonomously via autonomous control system 193, which may communicate with control system 190 and other components of vehicle propulsion system 100. Autonomous control system 193 may include an autonomous controller, for example. Autonomous control system 193 may receive information from on-board navigation system 132, where the navigation system may be configured to determine a current location of the vehicle using, for example, a GPS receiver configured to triangulate the position of the vehicle relative to satellites or terrestrial-based transmitter towers. Navigation system 132 may be further configured to develop routes from a current location to a selected destination, as well as display a map and present driving directions to the selected destination via, for example, message center 191. The autonomous control system 193 may be guided in navigating the vehicle via the sensors 133, which may include lasers, onboard cameras, radar, sonar, acoustic sensors, etc. Additionally or alternatively, the autonomous control system 193 may be guided in navigating the vehicle via V2X communications with other vehicles or infrastructures, as described above. In this way, based on information retrieved from sensors (e.g. 132, 133) and V2X communications, the autonomous controller may "see" the roadway and vehicle surroundings, to enable navigation and avoidance of various obstacles while operating in autonomous mode. The autonomous control system may further be configured to control one or more subsystems (not specifically shown) including but not limited to a brake subsystem, a suspension subsystem, a steering subsystem, and a powertrain subsystem. The autonomous control system may control any one of these subsystems by outputting signals to control units associated with such subsystems. Such signals or commands may cause the subsystems to operate in accordance with driving characteristics associated with a particular driving mode (e.g. selectable driving mode). For example, such driving characteristics may include how aggressively the vehicle accelerates and decelerates, how much space the vehicle leaves behind a front vehicle, how frequently the autonomous vehicle changes lanes, etc.

In some examples, vehicle propulsion system 100 may include route-learning module 135. Route-learning module 135 may be used to learn commonly traveled routes of the vehicle over time, for example. In some examples, route-learning module 135 may correlate learned travel routes with loads associated with the vehicle, for example when the vehicle is likely or expected to be towing a trailer or other cargo. Briefly, while the vehicle is in operation route-learning module 135 may continuously collect data from various sensor systems described herein (e.g. 132, 199, 133), as well as other feedback signals including but not limited to engine speed, engine load, air temperature, engine knock sensor, tire pressure sensors, engine temperature sensors, brake heat sensors, brake pad status sensors, tire tread sensors, fuel sensors, oil level and quality sensors, air quality sensors, etc. In this way, commonly traveled routes may be learned over time. Routes that are not commonly traveled may periodically be forgotten, so as not to amass an exorbitant amount of data over time. As a non-limiting example, data pertaining to vehicle travel routines may be applied to an algorithm that feeds into one or more machine learning algorithms to determine common vehicle travel routes.

In some examples, vehicle propulsion system 100 may include a fuel decision assistance module 195. Fuel decision assistance module 195 may in some examples take into account data from route-learning module 135, to provide a vehicle operator or autonomous controller with suggested fuel types for refueling fuel tank 144. Fuel decision assistance module 195 may additionally or alternatively utilize information from one or more of onboard navigation system 132, V2X communications, sensors 133, etc., for providing a suggestion of fuel type to refuel fuel tank 144. As an example, fuel decision assistance module 195 may display suggested fuel types via message center 191. However, it may be understood that autonomously controlled vehicles may in some examples conduct refueling operations autonomously in conjunction with a smart fueling system, and in such examples fuel decision assistance module 195 may, via control system 190, communicate with such a smart fueling system to coordinate fueling based on a suggestion of fuel type provided via fuel decision assistance module 195.

Vehicles with a vehicle propulsion system such as that described above with regard to FIG. 1 may in some examples be part of a fleet of vehicles participating in one or more of a vehicle-sharing model or service, a ride-sharing model or service, and a ride-hailing model or service. Such services are broadly referred to herein as vehicle-for-hire services. Discussed herein, it may be understood that a vehicle-sharing model may comprise a model of vehicle rental where a person can rent on-demand a vehicle for varying amounts of time, where the vehicle is driven by the person renting the particular vehicle. It may be further understood that a ride-sharing model refers to programs in which passenger trips are combined for passengers with a common destination (e.g. carpooling and vanpooling), with a goal of filling otherwise empty seats to ultimately save on costs. It may be still further understood that a ride-hailing model encompasses companies and services similar to a taxi services, where a customer hires a driver to take them exactly where they desire to go, via one of hailing a taxi, calling up a vehicle/taxi service by phone, or virtually hailing a vehicle (and driver in the case of non-autonomous vehicles) via a software application on a remote computing device, for example. Each of the above-described models are encompassed by the present disclosure. Furthermore, it may be understood that vehicles that are part of a delivery service fleet are encompassed by the present disclosure.

Turning now to FIG. 2, a transportation facilitation system 200 of the present disclosure is depicted. It may be understood that transportation facilitation system 200 may be used to manage a fleet of vehicles as a function of transportation requests. In one example, managing the fleet of vehicles may include coordinating a customer or customers requesting a ride with an appropriate driver operating a particular vehicle, or simply with an appropriate vehicle in the case of an autonomously operated vehicle. In another example, managing the fleet of vehicles may include coordinating a customer desiring to rent a vehicle participating in a vehicle-sharing model with an appropriate vehicle. In still another example, managing the fleet of vehicles may include coordinating vehicles for delivery of goods or services to customers based on customer requests. In each of the above-mentioned example uses of transportation facilitation system 200, it may be understood that a goal of the transportation facilitation system may be to optimize fuel type used by vehicles included in the fleet for meeting customer requests. For example, as will be discussed in greater detail below, routes or trip/travel plans may be known ahead of time (e.g. prior to picking up a customer or customers requesting a ride, prior to a customer initiating a drive cycle in a vehicle-sharing vehicle, and/or prior to a vehicle being selected for delivery of a particular package or packages). Because such routes may be known ahead of time, the transportation facilitation system 200 may in one example select a vehicle to meet a particular request based on a fuel type currently stored in a fuel tank of such a vehicle. As an example, a vehicle with high octane fuel stored in its fuel tank may be selected for a route that includes substantial uphill travel and/or high vehicle speeds and/or multiple passengers, while a vehicle with low or medium octane fuel may be selected for a route that is essentially devoid of uphill travel, high vehicle speeds, and multiple passengers. In other words, octane content may be associated with an estimated engine load. In some examples, the estimated engine load may comprise an average estimated engine load for a particular travel route. For example, an average estimated engine load greater than a first threshold load may indicate a route where high octane fuel is desirable. An average estimated engine load lower than the first threshold load but greater than a second threshold load may indicate a route where medium octane fuel is desirable. An average estimated engine load lower than the second threshold load may indicate a route where low octane fuel is desirable. Other exemplary embodiments will be discussed in further detail below. It may be understood that in some examples, low octane fuel may pertain to "regular" grade fuel (e.g. 87 AKI octane), medium octane fuel may pertain to "mid-grade" fuel (e.g. 89 AKI octane), and high octane fuel may pertain to "premium" fuel (e.g. 92-93 AKI octane). In other examples, low octane fuel may pertain to low ethanol content (e.g. E0 or E10), and high octane fuel may pertain to medium or high ethanol content (e.g. E20 or E85). In some examples, rather than select a vehicle that already has a particular type of fuel stored in its fuel tank for a particular route, the transportation facilitation system 200 may recommend to a driver or controller of a vehicle to refuel with a particular type of fuel prior to embarking on the particular route. As will be elaborated in further detail below, there may be a variety of factors associated with trip plans which may be taken into account for pairing particular vehicles with particular customer requests. As examples, current traffic conditions, current weather conditions, terrain (hills), expected vehicle speeds on route, number of passengers, amount of cargo, proximity of available vehicles, fuel levels of available vehicles, vehicle type (e.g. SUV, sedan, truck), etc., may be factors that may be accounted for when pairing vehicles with particular requests.

Broadly defined, transportation facilitation system 200 may comprise components described below. Transportation system 200 may include a customer device 210 running customer app 218, a driver device 220 running driver app 228, and fleet management system 205. It may be understood that the customer app, driver app, and fleet management system may together comprise a single software application. In some examples, discussed herein, customer app 218 may be referred to as customer-side app 218 to illustrate it is the side of the software application the customer interacts with on customer device 210. Similarly, driver app 228 may be referred to as driver-side app 228 to illustrate it is the side of the software application the driver interacts with on driver device 220. Thus, it may be understood that the fleet management system comprises the backend of the software application. It may be understood that each of the customer device 210 and the driver device 220 may comprise remote computing devices, including but not limited to smartphones, laptops, tablets, etc. Each of the customer device 210 and the driver device 220 may include a logic subsystem 211 and 221, respectively. Each of logic subsystem 211 and logic subsystem 221 may be substantially similar in terms of function, and thus the description below equally applies to both logic subsystem 211 and logic subsystem 221.

Logic subsystem 211 and 221 may include one or more physical devices configured to execute one or more instructions. For example, the logic subsystems may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystems (e.g. 211 and 221) may include one or more processors that are configured to execute software instructions. Additionally or alternatively, the logic subsystems may include one or more hardware or firmware logic machines configured to execute hardware or firmware instructions. Processors of the logic subsystems may be single or multi-core, and the programs executed thereon may be configured for parallel or distributed processing. The logic subsystems may optionally include one or more engines for processing and analyzing data.

Each of the customer device 210 and driver device 220 may include a data-holding subsystem 212 and 222, respectively. Each of data-holding subsystem 212 and 222 may be substantially similar in terms of function, and thus the description below equally applies to both data-holding subsystem 212 and data-holding subsystem 222.

Data-holding subsystem 212 and data-holding subsystem 222 may include one or more physical, non-transitory devices configured to hold data and/or instructions executable by the logic subsystems (e.g. 211 and 221, respectively) to implement parts of the herein described methods and processes. When such methods and processes are implemented, the state of data-holding subsystem 212 and 222 may be transformed (for example, to hold different data).

The data-holding subsystems (e.g. 212 and 222) may include removable media and/or built-in devices. Data-holding subsystem 212/222 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 212/222 may include devices with one or more of the following characteristics: volatile, nonvolatile, dynamic, static, read/write, read-only, random access, sequential access, location addressable, file addressable, and content addressable. In some embodiments, the logic subsystem 211 and data-holding subsystem 212 may be integrated into one or more common devices, such as an application-specific integrated circuit or a system on a chip. Similarly, in some embodiments, the logic subsystem 221 and the data-holding subsystem 222 may be integrated into one or more common devices such as an application-specific integrated circuit or a system on a chip, similar to that discussed above. It is to be appreciated that each of data-holding subsystem 212 and data-holding subsystem 222 includes one or more physical, non-transitory devices.

Customer device 210 may include display subsystem 213, and driver device 220 may include display subsystem 223. Each of display subsystem 213 and display subsystem 223 may be substantially similar in terms of function, and thus the description below equally applies to both display subsystem 213 and display subsystem 223. The display subsystems (e.g. 213 and 223) may be used to present a visual representation of data held by data-holding subsystems (e.g. 212 and 222, respectively). As the herein described methods and processes change the data held by the data-holding subsystems and thus transform the state of the data-holding subsystems, the state of the display subsystems may likewise be transformed to visually represent changes in the underlying data. Each of the display subsystems (e.g. 213, 223) may include one or more display devices utilizing virtually any type of technology.

Each of customer device 210 and driver device 220 may include communication subsystem 214 and communication subsystem 224, respectively. Each of communication subsystem 214 and communication subsystem 224 may be substantially similar in terms of function, and thus the description below equally applies to both communication subsystem 214 and communication subsystem 224.

The communication subsystems (e.g. 214 and 224) may be configured to communicatively couple customer device 210 and driver device 220 with one or more other computing systems, such as fleet management system 205, traffic management server 235, weather server 240, etc., each of which will be discussed in further detail below. Each of the communication subsystems may include wired and/or wireless communication devices compatible with one or more different communication protocols. As non-limiting examples, each of the communication subsystems may be configured for communication via a wireless telephone network, a wireless local area network, a wired local area network, a wireless wide area network, a wired wide area network, etc. In some examples, the communication subsystems may allow customer device 210 and/or driver device 220 to send and/or receive messages to and/or from other devices and systems via network 231 such as the public Internet. For example, communication subsystem 214 may communicatively couple customer device 210 with fleet management system 205 via network 231. Communication subsystem 224 may communicatively couple driver device 220 with fleet management system 205 via network 231. Customer device 210 may in some examples be communicatively coupled via communication subsystem 214 to one or more of traffic management server 235, weather server 240, an appropriate vehicle control system 190 (where applicable), and cloud-based server 250, via network 231. Similarly, driver device 220 may in some examples be communicatively coupled via communication subsystem 224 to one or more of traffic management server 235, weather server 240, an appropriate vehicle control system 190 (where applicable), and cloud-based server 250, via network 231. In some examples, network 231 may be the public Internet.

Each of customer device 210 and driver device 220 may include a GPS module 215 and GPS module 225, respectively. It may be understood that GPS module 215 and GPS module 225 may be substantially similar in terms of functionality. Each of GPS module 215 and GPS module 225 may be capable of receiving (via a dedicated receiver in each of 215 and 225) satellite signals which may enable a location of customer device 210 and driver device 220 to be accurately determined.

Customer device 210 may include a customer app (e.g. software application) 218. Similarly, driver device 220 may include a driver app (e.g. software application) 228. The customer app 218 will be first described below.

Customer app 218 may in one example enable a customer to request a ride-hailing service. In other examples, customer app 218 may additionally or alternatively enable a customer to request a ride-sharing service, or a vehicle-sharing service. With regard to the transport facilitation system 200 described herein, customer app 218 may include options for inputting a desired starting location and a desired ending location. In some examples, customer app 218 may additionally include options for inputting any planned stops or intermediate destinations between the desired starting location and the desired ending location. In some examples, customer app 218 may include options for specifying a desired time in which the customer desired to be picked up, or a desired time in which the customer desires to commence driving a car-share vehicle. In some examples, customer app 218 may, in conjunction with GPS module 215 and optionally in conjunction with information retrieved from one or more of traffic management server 235 and weather server 240, develop or plan a route based on one or more of the desired starting and ending locations (and any intervening planned destinations) and desired start time.

When used for vehicle-for-hire services, customer app 218 may include options for selecting or inputting user preferences. As an example, a customer may select a preference for lower price per ride over performance. In such an example, the fleet management system 205 (discussed in further detail below) may downgrade importance of using optimal fuel type for a particular route in order to reduce costs passed on to the customer. As another example, a customer may select a green option, which may indicate a preference for fuel economy or reduced emissions. In such an example, the fleet management system 205 may match a particular route with a vehicle with a fuel type that is in line with the customer preference for fuel economy and/or reduced emissions. In another example, the customer may select an option to put emphasis on vehicle performance. In such an example, the fleet management system 205 may attempt as best possible to pair a route for the customer with an optimal fuel type (e.g. high octane) for the particular route. Still further selection options are within the scope of this disclosure. For example, a customer may select a preference for use of fuel blends that include ethanol.

As will be elaborated in further detail below, in some examples where the customer app is used for a vehicle-sharing service, the customer app may receive refueling instructions for a particular vehicle paired with the customer based on a particular transportation request.

In yet another example, customer app 218 may additionally or alternatively enable a customer to purchase an item or items for delivery (e.g. Amazon app, Grubhub app, etc.). In such a case, customer app 218 may include options for specifying a desired location for the purchased item or items to be delivered to. Such an app may in some examples include options for specifying a desired time and/or desired day for the purchased item or items to be delivered to the desired location.

It may be understood that in some examples there may be different customer apps for each of a ride-hailing service, car-sharing service, ride-sharing service, shopping service, package or cargo delivery service, etc. However, for brevity the above description simply referred to customer app 218. Furthermore, it may be understood that the customer requests submitted via the app may be routed via network 231 to fleet management system 205, the function of which has been alluded to above and which will be further elaborated below.

Turning now to the driver app 228, it may be understood that via the driver app 228, a driver of a vehicle (e.g. ride-sharing vehicle, ride-hailing vehicle, item delivery vehicle) may receive instructions on driver device 220 from fleet management system 205. In one example where the driver is employed by a ride-share or ride-hailing service, instructions received via the driver app may pertain to pickup and drop-off locations based on customer requests, suggested routes based on the customer requests, etc. In some examples, which will be elaborated in further detail below, driver app 228 may receive instructions from fleet management system 205 regarding a suggested fuel type and suggested amount of said fuel type for refueling the vehicle. In similar fashion, in an example where the driver is employed by a delivery service, instructions received via the driver app may pertain to a destination or a sequence of destinations (e.g. route) for delivery of packages or other items (e.g. ordered food, etc.) based on the above-described customer requests submitted via the customer app 218. In the case where the driver is employed by a delivery service, instructions received may also in some examples include refueling recommendations pertaining to fuel type and recommended fuel fill level.

Turning now to fleet management system 205, it may be broadly understood that fleet management system 205 may, via network 231, receive customer requests from customer app 218, process the customer requests, and send appropriate instructions to driver app(s) 228 stored on driver device(s) 220. With regard to the present disclosure, it may be understood that the processing of the customer requests via fleet management system 205 may include the fleet management system 205 retrieving information pertaining to current fuel type and fuel level currently stored in a fuel tank associated with a driver of a vehicle. Such information may in some examples be communicated to fleet management system 205 via the driver app 228. Additionally or alternatively, such information may in some examples be communicated to fleet management system 205 via a vehicle control system (e.g. 190), where such a vehicle control system is in wireless communication with the fleet management system. In this way, fleet management system 205 may match a particular driver via the driver app 228 to a particular customer request, based at least in part on the current fuel type and fuel level stored in a fuel tank of the vehicle associated with the particular driver. In some examples, rather than matching a particular vehicle/driver with a particular customer request based on fuel type currently in a fuel tank of the particular vehicle, fleet management system 205 may send instructions to a driver via the driver app 228 requesting that the driver of the particular vehicle fill the fuel tank with a specific fuel type. In some examples, filling the fuel tank with a specific fuel type may further include filling the fuel tank with the specific fuel type to a specified fuel fill level. In such a circumstance, the instructions may include a fuel filling station location where the specified fuel type may be found, optimized for example based on cost and proximity to a current location of the particular vehicle. In such a circumstance, the instructions may further include via the driver app 228, providing a suggested route to the specified fuel filling station location where the specified fuel type may be found. However, in the case of an autonomously operated vehicle, fleet management system 205 may send instructions pertaining to suggested fuel type, suggested fuel fill level, suggested location to refuel the vehicle, suggested route, etc., directly to a controller (e.g. 190) of a selected vehicle, such that the vehicle may autonomously navigate to the suggested fuel filling station. Furthermore, in cases where the fuel filling station comprises a smart fuel filling station (see FIG. 3), the controller of the vehicle may wirelessly communicate the suggested fuel type and the suggested fuel fill level to a pump controller. Such an operation may not be limited to autonomous vehicles. For example, the suggested fuel type and suggested amount may be sent from the fleet management system 205 to the driver app 228, and the driver app 228 may be used to wirelessly communicate the suggested fuel type and suggested amount to the pump controller associated with a smart fuel filling station. In yet another example, the driver app 228 may communicate the suggested fuel type and suggested amount to a controller of a vehicle the driver is associated with, and then the controller may wirelessly communicate the suggested fuel type and the suggested amount to the pump controller associated with a smart fuel filling station.

Similar to that discussed above with regard to customer device 210 and driver device 220, fleet management system 205 may include processor 285, memory 286, data storage 287, communication system 288, and display system 289. Processor 285 may include any suitable computer, computing entity, or processing device including various computer hardware or software modules and may be configured to execute instructions stored on any applicable computer-readable storage media. For example, processor 285 may include a microprocessor, a microcontroller, a digital signal processor (DSP), an application-specific integrated circuit (AISC), a Field-programmable Gate Array (FPGA), or any other digital or analog circuitry configured to interpret and/or to execute program instructions and/or to process data. Although illustrated at FIG. 2 as a single processor, it may be understood that processor 285 may include any number of processors configured to perform, individually or collectively, any number of operations described herein with regard to fleet management system 205. Additionally, one or more of the processors 285 may be present on one or more different electronic devices, including but not limited to cloud-based server 250.

Processor 285 may interpret and/or execute program instructions associated with fleet management system 205 and/or process data stored in memory 286, in data storage 287 or both data stored in memory 286 and data storage 287. In some embodiments, processor 285 may fetch program instructions from data storage 287, and load the program instructions in memory 286. After the program instructions are loaded into memory 286, processor 285 may execute the program instructions.

Memory 286 and data storage 287 may include computer-readable storage media for carrying or having computer-executable instructions or data structures stored thereupon. Such computer-readable storage media may include any available media that may be accessed by a general-purpose or special-purpose computer, such as processor 285. By way of example, such computer-readable storage media may include tangible or non-transitory computer-readable storage media including RAM, ROM, EEPROM, CD-ROM or other optical disk storage, magnetic disk storage or other magnetic storage devices, flash memory devices (e.g. solid state memory devices), or any other storage medium which may be used to carry or store instructions or data structures and which may be accessed by a special-purpose or general-purpose computer.

Fleet management system 205 may include a communication system 288, for communicatively coupling fleet management system 205 with one or more other computing systems including but not limited to customer device 210, driver device 220, traffic management server 235, weather server 240, cloud-based server 250, one or more vehicle control system(s) 190, etc. Communication system 288 may include wired and/or wireless communication devices compatible with one or more different communication protocols. The communication system may be configured for communication via a wireless telephone network, a wireless local area network, a wired local area network, a wireless wide area network, a wired wide area network, etc. In one example, communication system may enable fleet management system 205 to send and/or receive messages to and/or from other devices and systems via network 231, such as the public Internet.

Fleet management system 205 may include a display system 289, which may be used to present a visual representation of data held by data storage 287 (and in some examples cloud-based server 250). As the herein described methods and processes may change the data held by data storage 287 (and thus transform a state of data storage 287), the state of display system 289 may likewise be transformed to visually represent changes in the underlying data. Display system 289 may include one or more display devices utilizing virtually any type of technology.

As depicted, fleet management system 205 may include matching module 270. Matching module 270 may receive customer requests via customer interface 260. As discussed above, customer requests pertaining to vehicle-sharing, ride-sharing and/or ride-hailing services may include pickup and drop-off locations, and may further include suggested routes based on inputted pickup and drop-off locations. In other examples customer requests may include a desired location for a delivery, and may further include a specified time and/or day for the delivery.

Matching module 270 may further receive information pertaining to variables associated with vehicles comprising a fleet of vehicles 292 being managed via fleet management system 205 via provider interface 265. Fleet management system 205 may communicate (e.g. send information to and receive information from) with vehicles comprising the fleet of vehicles 292 via one or more of driver app 228 and vehicle control system 190. It may be understood that each vehicle comprising the fleet of vehicles may include its own vehicle control system 190 and may further include a driver with a driver device 220 running driver app 228. For example, a current location of particular vehicles comprising the fleet may be communicated to matching module 270 via provider interface 265 from driver app 228. In other words, driver app 228 may continually retrieve information pertaining to vehicle location, and may communicate such information to matching module 270 of fleet management system 205 via provider interface 265. Such information may include in some examples an estimated time or distance until a particular vehicle drops off a passenger or passengers. In other words, such information may include an estimated time or distance until a particular vehicle may accept another customer request (e.g. become available). Such information may be useful for route planning, as will be discussed in further detail below. Additionally or alternatively, information pertaining to current vehicle location may be communicated to matching module 270 directly from a vehicle control system 190, in collaboration for example with an onboard navigation system (e.g. 132).

Information provided to matching module 270 from one or more of vehicle system controller 190 and driver app 228 may include a current fuel type stored in a fuel tank of the vehicle associated with the driver using driver app 228, and a current level of the current fuel type stored in the fuel tank. Such information may be communicated to matching module 270 via driver app 228 and/or vehicle control system 190. In examples where the driver app 228 conveys the information pertaining to fuel type and fuel level, it may be understood that a driver may manually input such information into the driver app 228 (or the app may receive such information from a smart fueling system). In other examples, the vehicle control system may communicate such information to matching module 270. In examples where the vehicle control system communicates such information to matching module 270, such information pertaining to fuel type may be input into the vehicle control system manually (e.g. via instrument panel 196), or may be communicated to the vehicle control system via wired or wireless communication with a fuel pump controller of a smart fuel filling station. For example, while a vehicle control system may readily infer fuel level based on output from a fuel level sensor, it may be challenging to infer fuel type without a driver inputting such information into the control system of a vehicle, or via the control system receiving such information pertaining to fuel type from a fuel pump controller of a smart fuel filling station. But fuel octane may be inferred using an engine knock sensor to identify knock-limited spark advance as a function of engine speed, engine load, air temperature, etc., and comparing to known knock-limited spark advance with a specific fuel octane. Also fuel ethanol content may be inferred using an exhaust oxygen sensor to determine stoichiometric air/fuel ratio, which varies with ethanol content. If ethanol content is above a threshold (for example above 20%), it may be assumed that the fuel is also high octane.

As discussed above, in a case where a customer request includes a ride-share request, a vehicle-share request or a ride-hailing request, customer input into the customer app 218 pertaining to pickup and drop-off location may be used to suggest desirable routes, which may be communicated to matching module 270 via customer interface 260. Alternatively, in a case where the customer request includes delivery of a package or other item, such route information may not be provided to matching module 270 from customer interface 260. In such a case, route planning module 255 may be used, which may take into account current locations of vehicles being managed by fleet management system 205, as input into provider interface 265 for example. Route planning module may take into account any number of customer requests pertaining to requested deliveries, and may be used to optimize routes which vehicles associated with fleet management system 205 may travel in order to efficiently fulfill the customer delivery requests. To assist in route planning, route planning module may include GPS module 256.

Matching module 270 may request and retrieve information pertaining to current and forecasted environmental conditions, as well as current and forecasted traffic conditions. Such information may be useful in matching particular vehicles of the fleet with particular customer requests. Traffic management server 235 and weather server 240 may be communicably coupled to fleet management system 205 via wireless network 231. Via traffic/weather interface 263, information retrieved from traffic management server 235 and/or weather server 240 may be communicated to matching module 270. It may be understood that information stored at traffic management server may comprise real-time traffic information and forecasted or expected traffic information. For example, information stored at traffic management server may include details regarding current and expected congestion. In some examples, information stored at traffic management server 235 may be retrieved from sensor systems associated with a smart traffic system. It may be further understood that information stored at weather server 240 may comprise current and forecasted weather/environmental conditions. Current and forecasted weather/environmental conditions may include one or more of current and forecasted ambient temperature, ambient pressure, ambient humidity, likelihood of rain or snow, etc. It may be understood that such information may be used by matching module 270 in order to pair particular vehicles comprising the fleet of vehicles 292 with particular routes in order to satisfy customer requests, as will be elaborated in further detail below.

As discussed above, a goal of fleet management system 205 may be to match or pair vehicles with routes in such a way as to optimize usage of fuel type. In some examples this may include matching a particular vehicle with a route based on fuel already included in a fuel tank of the particular vehicle. In other examples this may include requesting, via the fleet management system, that a particular vehicle fuel tank be filled to a specified level with a particular fuel type prior to embarking on a particular route. Accordingly, matching module 270 may further communicate with fuel optimizer module 273 and cost optimizer module 272. In some examples, fuel optimizer module 273 and cost optimizer module 272 may be a part of or included in matching module 270. Fuel optimizer module 273 and cost optimizer module 272 may in some examples additionally communicate with one another.

Fuel optimizer module 273 may be used to infer an optimal fuel type for particular suggested routes communicated to fleet management system 205 or developed by fleet management system 205. For example, fuel optimizer module 273 may take into account environmental variables including but not limited to terrain, road grade, altitude changes, current and forecasted weather conditions, current and forecasted traffic conditions, etc., along suggested or developed routes, and may provide one or more suggestions for optimal fuel type to use for particular suggested or developed routes. In some examples, fuel optimizer module 273 may prioritize fuel type as a function of particular suggested or developed routes. For example, fuel optimizer module may suggest a first fuel type as a first priority for a particular route, may suggest a second fuel type as a second priority for the particular route, and may suggest a third fuel type as a third priority for the particular route. In this way, depending on what fuel type(s) (and current fuel levels) are currently stored in fuel tanks of vehicles comprising the fleet of vehicles, matching module 270 may take into account information provided by fuel optimizer module 273 for pairing vehicles with particular suggested or developed routes, to optimize fuel type used for the particular suggested or developed routes. As an example, a vehicle that currently has a high octane fuel stored in its fuel tank may be matched to a demanding route that includes substantial uphill travel and/or high vehicle speeds. In another example, matching module 270 may, in conjunction with fuel optimizer module 273, determine that it may be desirable to instruct a particular vehicle to refuel with a particular fuel type (e.g. high octane fuel) prior to embarking on a particular suggested or developed route.

Cost optimizer module 272 may be used to factor in variables pertaining to cost benefit analysis for pairing or matching vehicles with particular suggested or developed routes, where such pairing or matching is based at least in part on optimal fuel type usage for the particular suggested or developed routes. Accordingly, cost optimizer module may communicate with fuel optimizer module 273 and matching module 270. As an example, a particular customer request may include a starting and ending point, which may further include a suggested route (or the route may be developed by the route planning module). Fuel optimizer module 273 may be used to determine an optimal fuel type (or in some examples a first priority fuel type, second priority fuel type, third priority fuel type, etc.) for the suggested route, taking into account at least current and forecasted weather/traffic conditions, altitude changes, cargo load, etc., as discussed above. Matching module 270 may identify a candidate set of vehicles which may be used to satisfy the customer request. Cost optimizer module 272 may be used to minimize cost associated with satisfying the customer request, as a function of information retrieved. For example, cost optimizer module 272 may infer that it may be more cost-efficient to pair a particular vehicle that currently includes a second priority fuel type in its fuel tank with a particular route, rather than pairing a vehicle that currently includes a first priority fuel type in its fuel tank, because the vehicle with the first priority fuel type in its fuel tank is farther away from the starting point comprising the customer request than the vehicle with the second priority fuel type in its fuel tank.

In other related examples, cost optimizer 272 may account for current prices of particular fuels, to make a determination as to whether it is cost effective to use a particular fuel over another fuel. In some examples, the cost optimizer 272 may take into account customer preferences inputted into customer app 218, or in some examples driver preferences input into driver app 228. Such preferences may include willingness to pay for higher priced fuel to improve performance, preference for fuel economy over performance, preference for reduced emissions over performance, etc.

Thus, it may be understood that matching module 270 may attempt to pair candidate vehicles comprising the fleet of vehicles 292 with particular routes in such a way as to optimize fuel type usage while at the same time minimizing cost associated with such pairing as much as possible. When a match is made via matching module 270, fleet management system may send instructions via provider interface 265 to one or more of a vehicle control system 190 of the vehicle matched to a particular route and/or to a driver device 220 via driver app 228. Such instructions may in some examples include a map and driving directions pertaining to the customer request. Such instructions may in some examples include instructions pertaining to refueling of the fuel tank of a matched vehicle, which may include fuel type, amount of fuel, and optimal fuel filling station location. Furthermore, fleet management system 205 may, via customer interface 260, send updates and or instructions pertaining to the customer request to customer device 210 running customer app 218. For example, fleet management system 205 may provide to customer app 218 a status of the matched vehicle (e.g. current location and estimated time until the vehicle reaches the customer whether that relates to a delivery or a ride-hailing pickup, etc.).

As discussed above, in some examples fleet management system 205 may send instructions pertaining to refueling of a particular vehicle of the fleet of vehicles 292 to one or more of the driver app 228 and/or vehicle controller 190. In cases where the particular vehicle is operated via a driver, the driver may use the instructions to refuel the vehicle. For example, the driver may read the instructions via the driver app, or may read the instructions from a message center (e.g. 191) that in turn receives the instructions from the vehicle controller.

In other examples, the vehicle control system 190 and/or driver app 228 may wirelessly communicate with a fuel pump controller associated with a smart fueling station, where the instructions pertaining to refueling (e.g. fuel type and specified amount) may be received at the fuel pump controller for refueling of the particular vehicle accordingly. Such an example may be particularly useful for autonomously operated vehicles that may not include a vehicle operator, but may also apply to vehicles operated via a driver where driver app 228 may wirelessly communicate with the fuel pump controller such that the driver does not have to be bothered with correctly carrying out the refueling instructions.

Accordingly, turning now to FIG. 3, fueling system 300 is depicted. Fueling system 300 includes fueling station 302 for refueling fuel tank 144 included in fuel system 140 of vehicle propulsion system 100. Fueling station 302 may store and dispense one or more fuels. As an example, fueling station 302 may store a first fuel in first fuel reservoir 306, second fuel in second fuel reservoir 308, and third fuel in third fuel reservoir 310. It may be appreciated that while the depicted example illustrates the fuel station storing and dispensing three fuels, in alternate examples more or fewer fuel options may be available. In one example, a user (e.g. driver of a vehicle, station attendant, etc.) may communicate a desired fuel type to add to the fuel tank, along with a particular desired amount of said fuel type, via buttons 312, or corresponding touch-sensitive areas, on fuel sales display 315. Display 315 may include sub-displays providing fuel sales providing fuel sales related information, such as an indication of a volume of a selected fuel being filled in volume sub-display 320, and a cost of the selected fuel being dispensed in cost sub-display 325. Additional displays, while not shown, may be included representing sales information such as the composition of fuel being dispensed, how long the dispensing will take, fuel brand, etc.

Based on the user-communicated fueling profile received on sales display 315, fuel pump controller 305 may operate fuel pump 330 and pump an appropriate amount of fuel from the appropriate fuel reservoir 306, 308, 310. As depicted, the requested amount of fuel may be drawn from fuel reservoir 306, 308, 310 and delivered to fuel dispensing device 170 via a common fuel line 340. However, in alternate embodiments, each fuel reservoir 306, 308, 310 may be connected to fuel dispensing device 170 through distinct fuel lines and distinct fuel pumps.

In one example, as depicted, fueling station 302 may be a smart fueling station wherein fuel pump controller 305 can receive the requested fueling profile via wireless communication 350 through fueling station wireless communication device 355. In one example, the requested fueling profile may be transmitted to the fueling station by control system 190 via vehicle wireless communication device 134. Additionally or alternatively, the requested fueling profile may be transmitted by driver app 228 via wireless communication 350 to fuel pump controller 305. While not explicitly illustrated, in some examples (e.g. vehicle-sharing service) refueling instructions may be sent to the customer device (e.g. device 210 at FIG. 2) running the customer app (e.g. customer app 218 at FIG. 2) such that the customer can refuel the vehicle.

It may be understood that the refueling instructions provided to the vehicle controller and/or driver app 228 by way of fleet management system 205 may not be limited to one fuel type, but may in some examples comprise a mixture of two or more fuel types (e.g. fuel blend), depending on the particular route. Furthermore, while the above description with regard to FIG. 2 pertained to the fleet management system where refueling instructions or profiles are provided to a vehicle controller and/or driver app, it is herein appreciated that in other examples where a vehicle is not part of a fleet, it may be desirable to provide refueling suggestions as a function of learned/predicted or inferred future travel plans. An example of such a situation is described in detail below with regard to the method of FIG. 7.

Turning now to FIG. 4, a flow chart of an example method 400 to pair a vehicle that is part of a vehicle fleet (e.g. 292) with a customer transportation request, where the customer request includes one of a ride-hailing request, a ride-sharing request, a vehicle-sharing request or a delivery request, is shown. The method 400 may be implemented, in one example, by a system such as the transportation facilitation system 200 depicted at FIG. 2. Although illustrated as discrete blocks, various blocks may be divided into additional blocks, combined into fewer blocks, or eliminated, depending on the desired implementation.

Method 400 begins at 405, and includes receiving a customer transportation request at the fleet management system (e.g. 205). As discussed, such a request may be communicated to the fleet management system from a customer app (e.g. 218). In a case where the request pertains to a ride-share request, a ride-hailing request, or a vehicle-sharing request, the request may include information pertaining to a desired starting location and a desired ending location, and any intervening locations. Such a request may further include information pertaining to requested date, requested time, and other information including but not limited to number of passengers and number of bags of cargo. Such a request may include customer preferences, discussed above with regard to FIG. 2. In a case where the request pertains to a delivery request, the request may include information pertaining to delivery date, delivery time, delivery location, etc.

In examples where the request includes the desired starting location and the desired ending location, the request may further include suggested routes developed via the customer app in conjunction with a GPS module (e.g. 215). While the customer app may suggest routes based on starting and ending locations input into the customer app, it may be understood that in some examples the fleet management system may modify the suggested routes to optimize the manner in which transportation facilitation system 200 operates, or may develop particular routes independently of suggested routes provided via the customer app. For example, the fleet management system may modify a suggested route received from the customer app via a route planning module (e.g. 255) that is part of the fleet management system, or may rely on the route planning module to develop a route or routes.

In examples where the request includes a delivery request, routes for a vehicle or vehicles comprising the fleet of vehicles may be developed via the route planning module (e.g. 255). In other words, the fleet management system may, via the route planning module, factor in numerous customer requests pertaining to requested delivery locations, and plan routes in order to minimize costs associated with the deliveries while ensuring delivery requests are satisfied in a timely manner. Thus, while not explicitly illustrated via the methodology of FIG. 4, it may be understood that the fleet management system may be used to develop optimal routes for fulfilling customer requests with regard to delivery requests, and such routes may be further used in downstream steps associated with the methodology of FIG. 4 to pair a vehicle or vehicles with the developed routes as will be elaborated in further detail below.

Proceeding to 410, method 400 may include via the fleet management system, identifying candidate vehicles for fulfilling the customer request. Identifying candidate vehicles may include retrieving, via the fleet management system, current location of vehicles comprising the fleet and current status of vehicles comprising the fleet (e.g. whether a vehicle is currently carrying a customer or is en route to a delivery location, how long until it is inferred that a vehicle will be available for either receiving another customer or customers or embarking on another delivery routine, how long until a driver of a vehicle is off work, etc.). For example, one or more of vehicle control systems (e.g. 190) and driver apps (e.g. 228) may wirelessly communicate vehicle location information and status information to the fleet management system so that the fleet management system is appraised as to the current location and status of vehicles comprising the fleet. Based on location data the fleet management system may exclude certain vehicles as being too far away to qualify for fulfilling the customer request. Similarly, certain vehicles may be excluded from being a candidate vehicle based on current status. Vehicles that are not excluded may be understood to be candidate vehicles.

Proceeding to 415, method 400 may include determining a current fuel level and a current fuel type currently stored in fuel tanks of the candidate vehicles identified at step 410. It may be understood that current fuel type may pertain to an octane content of fuel, in some examples. As discussed above with regard to FIG. 2, such information may be communicated to the fleet management system via wireless communication between the fleet management system and a controller of each of the candidate vehicles. In another example, such information may be communicated to the fleet management system via wireless communication between the fleet management system and the driver app (e.g. 228) used by a driver of each of the candidate vehicles, where such information may be input into the driver app by way of communication between the wireless app and the vehicle controller or via a driver inputting such information into the driver app directly.

Proceeding to 420, method 400 may include determining an optimal fuel type for fulfilling customer requests. More specifically, step 420 may include determining an optimal fuel type for a particular route a vehicle will travel in order to fulfill a customer request. As discussed above with regard to FIG. 2, a fuel optimizer module (e.g. 273) associated with the fleet management system (e.g. 205) may be used to determine an optimal fuel type (or in some examples a first priority fuel type, second priority fuel type, third priority fuel type, etc.) for a vehicle to use when traveling a particular route corresponding to a customer request.

As examples, the fuel optimizer module may retrieve information by way of the customer app (e.g. 218) and/or in some examples route planning module (e.g. 255) pertaining to variables including but not limited to 1) number of passengers corresponding to a particular request, 2) number of bags or other cargo to be included in a vehicle corresponding to a particular request, 3) altitude changes associated with a particular route, for example amount (in miles) and duration of inferred uphill travel, 4) learned information corresponding to driver profiles of the candidate vehicles (e.g. whether a particular driver uses a maximum acceleration capability or not), 5) current and forecasted environmental conditions associated with a particular route, and 6) current and forecasted traffic conditions associated with a particular route. Taking such variables into account, the fuel optimizer module may indicate the optimal fuel type for a particular route includes a high octane fuel under conditions where the vehicle is expected to be heavily loaded (e.g. threshold vehicle speed for a particular route, threshold number of passengers for a particular vehicle type, threshold amount of cargo for a particular vehicle type, etc.) thus increasing a load on the engine. In another example, the fuel optimizer module may indicate a high octane fuel for routes that include substantial high speed operation (e.g. speed greater than a threshold speed for a predetermined amount of time along a route) and/or substantial uphill travel (e.g. altitude increase greater than a threshold altitude increase) over a suggested or developed route. As another example, the fuel optimizer module may indicate the optimal fuel type for a particular route includes fuel with a greater portion of ethanol (e.g. high or medium octane) for routes that include one or more of higher vehicle speeds, higher vehicle occupancy, higher cargo weight, higher ambient temperatures, higher altitudes, lower pressures and/or lower ambient humidity. As yet another example, the fuel optimizer module may indicate the optimal fuel type for a particular route includes fuel with a lower portion of ethanol (e.g. low octane) for routes that include one or more of lower vehicle speeds, lower vehicle occupancy, lower cargo weight, lower altitudes, higher humidity, cooler temperatures, etc. In yet another example, the fuel optimizer module may indicate the optimal fuel type for a particular route includes compressed natural gas, or diesel fuel, for a demanding route that includes for example higher vehicle speeds, higher engine loads, uphill travel, etc., without departing from the scope of this disclosure.

Proceeding to 425, method 400 may include, via the fleet management system (and in particular via the matching module (e.g. 270) of the fleet management system), matching a candidate vehicle with the customer request. In other words, at 425, method 400 may include matching a candidate vehicle with a particular route corresponding to the customer transportation request. The vehicle may be matched as a function of the determined optimal fuel type corresponding to the particular route as well as fuel level and fuel type currently stored in the vehicle.

While not explicitly illustrated, it may be understood that matching a vehicle with a particular suggested or developed route may in some examples include relying on the cost optimizer module (e.g. 272) of the fleet management system (e.g. 205) to optimize costs associated with pairing the vehicle with a particular route based at least in part on fuel type. For example, as mentioned above, the fuel optimizer module may provide more than one fuel type option including but not limited to a first priority fuel type, a second priority fuel type and a third priority fuel type. While it may be most desirable for a particular route to pair a vehicle with the first priority fuel type in its tank (e.g. within a threshold octane content of the first priority fuel type), doing so may increase costs and/or degrade overall fuel use efficiency in some examples. In such a case, it may be desirable to instead pair a vehicle that currently includes the second priority fuel type in its tank (e.g. within a threshold octane content of the second priority fuel type) with the particular route. Such a situation may occur, for example, when the vehicle that includes the second priority fuel type in its tank is closer in proximity to a starting location of a route as compared to the vehicle with the first priority fuel type in its tank. In other related examples, the cost optimizer module may take into account fuel economy for the candidate vehicles, and may attempt to pair particular routes not only with the optimal fuel type, but also as a function of fuel economy for reducing overall costs where possible. In still other examples, the cost optimizer may take into account customer preferences with regard to costs associated with performance over fuel economy, etc. Thus, it may be understood that in some examples the fuel optimizer may suggest the first priority fuel, the second priority fuel and the third priority fuel, and the cost optimizer may be used to select from the first priority fuel, the second priority fuel and the third priority fuel which fuel is most cost-efficient. In some examples, such a determination may be a function of current fuel price at particular fuel filling stations, how close to particular fuel filling stations the vehicle currently is, customer preferences, etc.

As discussed above with regard to FIGS. 2-3, there may be circumstances where the matching module determines that an appropriate vehicle for a particular route comprises a vehicle that has to be refueled prior to traveling the particular route. As one example, the fuel optimizer module may determine an optimal fuel type or fuel types for the particular route, and the fleet management system may further infer that of the set of candidate vehicles, none of the candidate vehicles include fuel types corresponding to the optimal fuel type or types (or if they do, fuel level is too low to carry out the transportation request). In such a case, the fleet management system may determine which vehicles of the candidate vehicles are due for refueling. In other words, the fleet management system may determine, based on the input received at step 420, which vehicles include fuel tanks with fuel level lower than a threshold level (e.g. 5% full, 10% full, etc.). Then the fleet management system, via the matching module, may match a vehicle due for refueling with the particular route. In this way, an optimal fuel type for the particular route may be added to the fuel tank of the vehicle prior to embarking on the particular route.

Accordingly, proceeding to 430, method 400 may include indicating whether the matched vehicle has to be refueled prior to embarking on the particular route as determined via the fleet management system. If so, method 400 may proceed to 435. At 435, method 400 may include sending refueling instructions to the driver application (e.g. 228) used via the driver of the vehicle matched to the particular route. In another example, particularly when the vehicle comprises an autonomously operated vehicle, such refueling instructions may be sent to a controller (e.g. 190) of the vehicle matched to the particular route. In still another example where the customer request pertains to a vehicle-sharing service, such refueling instructions may be set to the customer app (e.g. 218), or vehicle controller. As discussed above and in particular with regard to FIG. 3, a driver using the driver app may receive via the driver app the refueling instructions, and may proceed to refuel the fuel tank accordingly. In other examples, where the selected vehicle is an autonomously operated vehicle, the refueling instructions may be sent to a controller of the selected vehicle for a particular route. In either case, the instructions may further include a recommended fueling station location for carrying out the instructions pertaining to refueling. Furthermore, the instructions may include a particular fuel type or particular blend of fuel types and amount of fuel to add to the fuel tank of the vehicle. For example, it may not be desirable for a vehicle fuel tank to be filled to capacity with a high octane fuel, if the vehicle will be used for traveling a particularly demanding route that will not require using up a substantial amount of the fuel in the tank. Thus, the refueling instructions may pertain to an amount of fuel to satisfy a particular transportation request.

Whether the vehicle matched to the particular route has to be refueled or not, method 400 may proceed to 440. At 440, method 400 may include confirming with both the customer and the driver (or autonomous controller) of the match. For example, the fleet management system may, upon matching a route with a vehicle, send an update to a customer specifying a location where the vehicle will pick up the customer and, where applicable, other passengers. In another example, an update may be sent to a customer with a location of a requested vehicle for pickup. Similarly, the fleet management system may, where applicable, send updates to the driver app (or autonomous controller) confirming the match and providing driving instructions for efficiently directing the vehicle to the location to pick up the passenger or passengers, and may further include sending the route information for satisfying the customer request. The fleet management system may proceed to send updates (in some examples in real-time via a viewable display screen on the customer and/or driver device) pertaining to where each of the customer and the requested vehicle are located, estimated time until arrival of the vehicle, etc. Of course, in a case where the request includes a delivery, confirming the match and sending updates at 440 may be slightly different. For example, the fleet management system may send information to the customer including anticipated date and time of delivery, and such information may include tracking information which may be used by the customer to track a location of the delivery while the delivery is en route. Furthermore, in such an example, the fleet management system may send information to the driver app or autonomous controller of the matched vehicle, pertaining to the particular route along with anticipated delivery times for different deliveries, along with any other pertinent information which may be used by a driver or autonomous controller to navigate the vehicle along the particular route. In a case where the transportation request includes a vehicle-sharing service, confirming the match may include sending instructions to the customer pertaining to how to access the selected vehicle, and may additionally send instructions to the controller of the selected vehicle pertaining to how to enable access to the vehicle when the customer arrives at the vehicle.

Turning now to FIG. 5, a communication timeline 500 is depicted, illustrating communication between the customer app (e.g. 218), the fleet management system (e.g. 205) and the driver app (e.g. 228) or vehicle controller (e.g. 190) as a function of time. With regard to FIG. 5, time is depicted as increasing in the direction of arrow 501.

At 502, a transportation request is received via the customer app. Broadly stated, the transportation request may refer to a request for transportation related to getting a person or persons from one point to another (e.g. vehicle-for-hire service), or to a request for transporting an item or items to a desired location (e.g. delivery service).

In circumstances where the transportation request pertains to a vehicle-for-hire service, the transportation request may include at least a starting location and an ending location, and any intervening locations. In such an example, the transportation request may additionally or alternatively include a number of passengers, amount of cargo (e.g. estimated weight, number of bags, type of cargo, etc.), vehicle-type preference (e.g. truck, sedan, SUV, etc.), information pertaining to cost options (e.g. willingness of the customer to pay for improved vehicle performance, preference for fuel economy over vehicle performance, preference for luxury vehicle over a non-luxury vehicle, preference for reduced emissions, etc.), desired time and date of service, etc. As discussed above, in some examples the customer app may suggest a route or routes based on the starting location and the ending location, although in other examples the customer app may not suggest such routes, without departing from the scope of this disclosure.

In other examples where the transportation request includes a request for transporting an item or items to a particular desired location, it may be understood that the request may include information pertaining to the desired location, desired time window for delivery, desired date or date window for delivery, etc.

It may be understood that in response to the customer app receiving the transportation request, information pertaining to the transportation request may be sent (e.g. via network 231 depicted at FIG. 2) to the fleet management system.

Accordingly, at 504, the fleet management system obtains the transportation request. It may be understood that in the case of a vehicle-for-hire service or a delivery service, obtaining the transportation request may include receiving the transportation request from the customer app. In other examples obtaining the transportation request may include generating the transportation request based on a plurality of inputs from a plurality of customers. Such an example may apply to delivery vehicles where numerous delivery requests are received by the fleet management system, and where the fleet management system generates a particular transportation request that includes multiple delivery locations. At 506, the fleet management system determines a route based on the transportation request. For example, as mentioned above, in some examples a route may be suggested via the customer app, where such information may be further communicated to the fleet management system. It may be understood that the customer app may suggest a route when the transportation request pertains to a request for a vehicle-for-hire service. In such an example, determining the route at 506 may include relying on the suggested route. However, in other examples determining the route at 506 may include modifying the suggested route or developing a route independently of the suggested route. In an example where the transportation request pertains to a delivery request, it may be understood that the customer app may not suggest a route, but rather the route may be developed by the fleet management system taking into account a number of similar customer-generated requests.

With the route determined, at 508 the fleet management system develops a query to assess vehicle availability based on the determined route. The query may include information pertaining to current vehicle location status of vehicles included in the fleet (e.g. vehicle fleet 292 at FIG. 2) managed by the fleet management system, and current availability of the vehicles. It may be understood that current availability may include whether a vehicle is currently capable of accepting transportation requests, or is inferred to be capable at a specified time corresponding to the transportation request. In some examples, developing the query may include determining an area for which to send the query. The area may comprise a circular area of a defined radius, a square or rectangular area of a defined length and width, etc. Determining the area may be related to the starting location in a case where the transportation request pertains to a vehicle-for-hire service, for example. The query may be then sent over the network (e.g. network 231 at FIG. 2) to driver apps (e.g. driver app 228 at FIG. 2) and/or vehicle controllers (e.g. controller 190 at FIG. 2).

At 510, the query is received via one or more of the driver apps and vehicle controllers. The query is then processed via one or more of the driver apps and vehicle controllers. In other words, the driver apps and/or vehicle controllers may receive the query pertaining to vehicle location and availability, and based on the query may generate a response to the query. The response may include current vehicle location data (e.g. GPS coordinates, location on a grid map, etc.) along with information pertaining to whether the vehicle is currently available, time frame until the vehicle will be available if not currently available, etc. The response may then be sent over the network back to the fleet management system.

At 512, the fleet management system receives the results and identifies a subset of vehicles (e.g. candidate vehicles) that can fulfill the transportation request. In other words, at 512 the fleet management system may filter out or exclude any vehicles that are not within a predetermined proximity to the starting location (in an example where the transportation request pertains to a vehicle-for-hire service), that are not currently available or are not expected to be available for fulfilling the transportation request, etc.

With the subset of vehicles identified, at 514 the fleet management may develop another query to send to the subset of candidate vehicles pertaining to fuel type (e.g. octane content, diesel, compressed natural gas, gasoline, ethanol content, etc.) currently stored in a fuel tank of each of the identified vehicles. The query may further request information pertaining to fuel level of the fuel currently stored in the fuel tank of the candidate vehicles. The query may then be sent over the network to the candidate vehicles. More specifically, the query may be sent over the network to driver apps running on a driver devices corresponding to the candidate vehicles and/or vehicle controllers of the candidate vehicles.

At 516, the driver apps and/or vehicle controllers receive the query pertaining to fuel type and fuel level, and the query is processed. The results pertaining to the query are then sent over the network back to the fleet management system. At 518 the fleet management system receives the results of the query pertaining to fuel type and fuel level. At 520 the fleet management system determines an optimal fuel type for carrying out the transportation request. While step 520 is depicted as occurring after the fleet management system has established fuel type and fuel level for the candidate vehicles, it may be understood that in other examples the step of determining optimal fuel type for the determined route may be carried out at any time subsequent to the route being determined. In other words, while the fleet management system is identifying the candidate vehicles that can fulfill the transportation request and retrieving information from the candidate vehicles pertaining to fuel type and fuel level, the fleet management system may in parallel determine the optimal fuel type for fulfilling the transportation request.

Determining the optimal fuel type may include determining an optimal relative fuel octane content for the transportation request. As an example, the optimal fuel type may comprise high octane fuel, medium octane fuel, or low octane fuel. As discussed above, the fleet management system may rely on a fuel optimizer module (e.g. fuel optimizer module 273 at FIG. 2) that takes into account variables input into the customer app pertaining to the transportation request, along with other information including but not limited to current and forecast weather conditions along the determined route, current and forecast traffic conditions along the determined route, altitude changes corresponding to the determined route, terrain along the determined route, etc. Accordingly, step 522 includes retrieving weather conditions for the determined route, and step 524 includes retrieving traffic conditions for the determined route. While not explicitly illustrated, it may be understood that retrieving the weather conditions may include sending a request pertaining to current and forecast weather conditions along the determined route to a weather server (e.g. weather server 240 at FIG. 2), whereby the weather server may receive and process the request and may then send a response back to the fleet management system for use by the fuel optimizer module for assessing optimal fuel type for the transportation request. Along similar lines, it may be understood that retrieving the traffic conditions may include sending a request pertaining to current and forecast traffic conditions along the determined route to a traffic management server (e.g. traffic management server 235 at FIG. 2), whereby the traffic management server may receive and process the request and may then send a response back to the fleet management system for use by the fuel optimizer module for assessing optimal fuel type for the transportation request.

As discussed above, in some examples the fuel optimizer module may determine, rather than a single optimal fuel type, a set of desirable fuel types for the transportation request, such as the first priority fuel type, the second priority fuel type and the third priority fuel type discussed above. By determining a number of different fuel types ranked by priority, it may increase opportunity to pair one of the identified vehicles with the transportation request in a manner that accounts for a desirable fuel type for the transportation request.

Accordingly, at 526, the fleet management system selects a vehicle from the candidate vehicles for fulfilling the transportation request. More specifically, the matching module (e.g. matching module 270 at FIG. 2) may take into account the fuel types and fuel levels retrieved from the candidate vehicles, in conjunction with the information pertaining to optimal fuel type for fulfilling the request, for pairing a vehicle with the transportation request. Selecting a vehicle may additionally be based on customer-inputted preferences (e.g. fuel type preferences, cost-related preferences, vehicle-type preferences, etc.), as discussed in detail above.

With the vehicle selected, the fleet management system may send confirmation along with updates to the customer app. For example, updates may include location updates of the selected vehicle, so that the customer is apprised of the location of the selected vehicle. In some examples, location data may be updated in real-time, whereas in other examples vehicle location data may be updated periodically. In some examples, the fleet management system may additionally send instructions to the customer app. As an example, in a case where the transportation request comprises a request to use a vehicle that is part of a vehicle-sharing model, the instructions may include instructions for how to enter or access the selected vehicle (e.g. via use of a radio frequency identifier). Along similar lines, in some examples the selected vehicle may need to be refueled in a situation where the transportation request corresponds to a request for a vehicle that is part of a vehicle-sharing model. Accordingly, in such an example the fleet management system may send instructions to the customer app pertaining to recommended fuel type and recommended fuel amount to refuel the vehicle with.

In an example where the vehicle is part of a ride-sharing or ride-hailing service, the updates may include location data of the selected vehicle while the vehicle is en route to a predetermined location (e.g. starting location) set based on the transportation request. In such an example, the updates may additionally or alternatively include a time frame in which the selected vehicle is estimated to arrive at the predetermined location.

In an example where the vehicle is included in a fleet of delivery service vehicles, the fleet management system may send updates to the customer app pertaining to estimated delivery time, current location of the selected vehicle while the vehicle is en route to the delivery location, etc.

Accordingly, at 528, the customer app receives updates and/or instructions pertaining to the transportation request. While depicted as a single step, it may be understood that the customer app may repeatedly receive updates and/or instructions from the fleet management system pertaining to the transportation request, over time.

Returning to 526, in addition to sending updates and/or instructions to the customer app, the fleet management system may send instructions pertaining to the transportation request to the driver app or controller associated with the selected vehicle at 530. In the case of a ride-share vehicle or ride-hailing vehicle, the instructions may include pickup location of a passenger or passengers. The instructions in such an example may further include driving directions to the pickup location. The instructions in such an example may further include a requested time for arriving at the pickup location. It may be understood that the instructions in such an example may be sent to the driver app and/or vehicle controller in a case where the selected vehicle is operated via a driver, whereas the instructions may be sent to the vehicle controller in a case where the selected vehicle comprises an autonomous vehicle.

In the case of a vehicle-sharing service, the instructions may pertain to instructions for how to unlock a door of the selected vehicle in response to the customer arriving at the vehicle. For example, in response to a controller of the vehicle receiving communication that a correct RFID tag has been produced by the customer, the controller may command a door or doors unlocked. It may be understood that in the case of a vehicle-sharing service, any such instructions pertaining to how to verify when the customer arrives at the vehicle and how to enable access to the vehicle may be sent to the vehicle controller.

In the case of a delivery vehicle, the instructions may be sent to the driver app of a driver operating the selected vehicle and/or the vehicle controller in cases where a driver operates the selected vehicle. In a case where the selected vehicle is an autonomously operated delivery vehicle, the instructions may be sent to the vehicle controller of the selected vehicle. In such an example where the selected vehicle comprises a delivery vehicle, the instructions may include driving directions to a location for the delivery as specified by the transportation request.

Whether the selected vehicle is part of a vehicle-for-hire service or a delivery service, it may be understood that the instructions may in some examples include refueling instructions. The refueling instructions, as discussed, may pertain to recommended fuel type and recommended amount (e.g. gallons). In some examples the refueling instructions may include a recommended location at which to refuel the selected vehicle, and may further include driving directions to the recommended location. The recommended location may be based on one or more of cost, an indication that the fuel station comprising the recommended location is currently dispensing the recommended fuel type, proximity to the current or predicted location of the selected vehicle, etc.

Thus, discussed herein, a method may comprise obtaining a transportation request, determining a travel route pertaining to the transportation request, and selecting a vehicle from a plurality of available vehicles to provide the transportation request based on a respective relative fuel octane content of fuel stored by each of the available vehicles.

In such a method, the relative fuel octane content may be one of a high octane content, a medium octane content, and a low octane content.

In such a method, the method may further comprise determining a target fuel octane content for the travel route based on the transportation request. In such an example, selecting the vehicle may be based on the target fuel octane content.

In such a method, selecting the vehicle may be further based on a type of vehicle appropriate for the transportation request.

In such a method, selecting the vehicle may be further based on a proximity of the vehicle with respect to the transportation request.

In such a method, determining the travel route may further comprise determining one or more of an altitude increase for the travel route and an estimate of vehicle speeds for the travel route, and wherein selecting the vehicle is based on one or more of the altitude increase and the estimate of vehicle speeds.

In such a method, the method may further comprise determining a cargo load for the travel route based on the transportation request, where the cargo load includes one or more of a number of occupants, an estimated weight of luggage, and an estimated weight of a trailer. In such a method, selecting the vehicle may be further based on the cargo load.

In such a method, the method may further comprise retrieving information from the plurality of available vehicles pertaining to the relative fuel octane content of the fuel stored and a fuel level of the fuel stored by each of the available vehicles. In such an example, selecting the vehicle may be further based on the fuel level.

In such a method, determining the travel route may further comprise retrieving current and forecast weather and traffic conditions along the travel route. In such an example, selecting the vehicle may be further based on the current and forecast weather and traffic conditions.

Another example of a method comprises providing a refueling recommendation for a vehicle participating in a vehicle-for-hire service, the refueling recommendation based on a transportation request received from a customer and where the refueling recommendation includes a fuel type and a fuel fill amount.

In such a method, the transportation request may include a starting location and an ending location. In such an example, the travel route may be determined based on the starting location and the ending location and the fuel type and fuel fill amount may be based on the travel route. The fuel type and the fuel fill amount may further be a function of one or more of a vehicle speed, a number of occupants, a cargo load, an amount of an altitude increase corresponding to the travel route and current and forecast weather conditions and traffic conditions corresponding to the travel route. The vehicle-for-hire service may be a ride-sharing service or a ride-hailing service, and providing the refueling recommendation may include sending the refueling recommendation to a driver device used by a driver of the vehicle. In another example, the vehicle-for-hire service may be the ride-sharing service or the ride-hailing service but where the vehicle is autonomously operated in the absence of the driver. In such an example providing the refueling recommendation may include sending the refueling recommendation to a controller of the vehicle. In yet another example, the vehicle-for-hire service may be a vehicle-sharing service. In such an example, providing the refueling recommendation may further comprise sending the refueling recommendation to a customer device used by a customer that submitted the transportation request. In yet another example, the refueling recommendation may further include instructions pertaining to a location of a fuel filling station that is dispensing the fuel type and driving directions to the location of the fuel filling station.

While the methodology depicted above with regard to FIG. 4 and the communication timeline of FIG. 5 related to use of the fleet management system to coordinate requested or developed routes with fuel type (e.g. fuel octane content), it is herein recognized that there may be certain examples where it may be desirable to rely on related methodology for vehicles that are not part of a fleet of vehicles. Such methodology will be discussed below at FIG. 7.

Accordingly, to differentiate from the system of FIG. 2, FIG. 6A depicts an example transportation system 600 that includes vehicle propulsion system 100 and an operator device 610 running an operator app 615. While not explicitly illustrated, it may be understood that operator device may include similar subsystems as the customer device and/or driver device of FIG. 2. Specifically, operator device 610 may include a logic subsystem, a data-holding subsystem, a display subsystem, a communication subsystem, and a GPS module. For brevity a description of such subsystems are not reiterated here. It may be understood that operator app 615 may be different than the customer app and the driver app depicted at FIG. 2.

Transportation system 600 as discussed includes vehicle propulsion system 100. Thus, it may be understood that transportation system 600 includes an entirety of vehicle propulsion system 100 as depicted at FIG. 1, although for brevity and simplicity the depiction of vehicle propulsion system 100 shown at FIG. 6A includes selected components that are of particular relevance for the method of FIG. 7. Accordingly, depicted is control system 190 including controller 153 in communication with route-learning module 135, onboard navigation system 132, navigation sensors 133, autonomous control system 193 (under circumstances where the vehicle comprises an autonomously operated vehicle, otherwise the autonomous control system may be eliminated), fuel decision assistance module 195, and vehicle instrument panel 196. It may be understood that vehicle instrument panel 196 may include a touch screen (or other similar display device) that a vehicle operator or passenger may interact with, and may present information and selection items similar or the same as that presented on the operator device 610 by way of the operator app 615. Further depicted is fuel system 140 that includes fuel tank 144, fuel dispenser 170 and arrow 172 depicting delivery of fuel to fuel tank 144 from fuel dispenser 170.

Control system 190 as depicted at FIG. 6A may be communicatively coupled to other vehicles or infrastructures via wireless network 131, as discussed with regard to FIG. 1. While depicted by numeral 131, it may be understood that in some examples network 131 may be the same as network 231 depicted at FIG. 2. Via network 131 (or in some examples via wired communication), operator device 610 may be communicatively coupled to control system 190. Thus, it may be understood that input into the operator app 615 may be communicated to control system 190. Furthermore, operator device 610 and/or control system 190 may be communicably coupled via network 131 to traffic management server 325 and/or weather server 240.

While operator device 610 running operator app 615 is shown, it may be understood that in some examples operator device 610 and operator app 615 may not be included, and instead the transportation system may simply comprise the vehicle propulsion system of FIG. 1.

The transportation system depicted at FIG. 6A may be used to provide fueling recommendations to a vehicle operator (or autonomous controller) based on one or more of operator input into the operator app 615, operator input to the controller by way of instrument panel 196, operator input into the onboard navigation system 132, information retrieved from the route learning module and/or learned routes stored at the controller. An example methodology for providing a fueling recommendation via the transportation system of FIG. 6A is depicted below at FIG. 7.

Briefly, routes learned over time in conjunction with the route learning module may be relied on to provide fueling recommendations pertaining to fuel type and fuel amount for particular refueling events. Additionally or alternatively, fueling recommendations may be based on driver input into, for example, the onboard navigation system (e.g. 132). The fueling recommendations may additionally or alternatively be based on information learned over time via the vehicle controller pertaining to driver habits (e.g. if a driver commonly accelerates hard and/or regularly uses maximum torque/power capability of the engine), where such information may be determined in conjunction with the route learning module. The suggested refueling options in some examples may be based on driver input into the touchscreen associated with vehicle instrument panel 196 and/or via the operator app 615 stored on operator device 610. For example, such driver input may be related to personal preferences including but not limited to willingness to pay extra for improved torque/power/acceleration/towing capability with higher octane fuel, date and time at which a trailer will be attached to the vehicle, an estimated cargo load on a particular date/time, etc.

As discussed, the methodology discussed below with regard to FIG. 7 may be applicable to autonomous vehicles. In such examples, information learned over time may pertain to routes commonly traveled on particular days, particular times, when particular passengers are indicated to be in the autonomous vehicle and/or based on passenger-requested travel instructions (determined for example via passenger input into a touch screen associated with the vehicle instrument panel, passenger input into the operator app 615, etc.). Such information may be processed via the controller of an autonomous vehicle to provide refueling recommendations. In some examples, the controller of such an autonomous vehicle (or non-autonomous vehicle in other examples) may wirelessly communicate refueling instructions to a fuel pump controller (e.g. 305) of a smart fueling station (e.g. 302) for refueling the vehicle based on the refueling recommendations generated via the controller.

Turning now to FIG. 6B an example illustration 650 depicts in greater detail fuel system 140 including fuel tank 144. Accordingly, it may be understood that the description below with regard to FIG. 6B may apply to the vehicle propulsion system 100 depicted at FIG. 1 and FIG. 6A.

Engine 110 is coupled to fuel system 140 and evaporative emissions system 655. Fuel system 140 includes fuel tank 144 coupled to a fuel pump 658, the fuel tank supplying fuel to an engine 110 which propels a vehicle. Evaporative emissions system 655 includes fuel vapor canister 662. During a fuel tank refueling event, fuel may be pumped into the fuel tank from an external source (e.g. dispenser 170 at FIG. 1 and FIG. 6A) through refueling port 665. Fuel tank 144 may hold a plurality of fuel blends, including fuel with a range of alcohol concentrations, such as various gasoline-ethanol blends, including E10, E85, gasoline, etc., and combinations thereof. In some examples, fuel tank 144 may hold diesel fuel, or compressed natural gas, without departing from the scope of this disclosure. A fuel level sensor 668 located in fuel tank 144 may provide an indication of the fuel level ("Fuel Level Input") to controller 153. As depicted, fuel level sensor 668 may comprise a float connected to a variable resistor. Alternatively, other types of fuel level sensors may be used.

Fuel pump 658 is configured to deliver pressurized fuel to injectors (not shown) of engine 110. For example one or more fuel injectors may be provided for each engine cylinder (also not shown). It will be appreciated that fuel system 140 may be a return-less fuel system, a return fuel system, or various other types of fuel system. Vapors generated in fuel tank 144 may be routed to fuel vapor canister 662, via conduit 670, before being purged to an intake of engine 110.

Fuel vapor canister 662 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 662 may be purged to the intake of engine 110 by opening a canister purge valve 675. While a single canister 662 is shown, it will be appreciated that fuel system 140 may include any number of canisters. In one example, canister purge valve 675 may be a solenoid valve wherein opening or closing of the valve is performed via actuation of an associated canister purge solenoid.

Canister 662 may include a buffer 662a (or buffer region), each of the canister and the buffer comprising the adsorbent. As shown, the volume of buffer 662a may be smaller than (e.g., a fraction of) the volume of canister 662. The adsorbent in the buffer 662a may be same as, or different from, the adsorbent in the canister (e.g., both may include charcoal). Buffer 662a may be positioned within canister 662 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 662 includes a vent 678 for routing gases out of the canister 662 to the atmosphere when storing, or trapping, fuel vapors from fuel tank 144. Vent 678 may also allow fresh air to be drawn into fuel vapor canister 662 when purging stored fuel vapors to engine intake via purge line 679. While this example shows vent 678 communicating with fresh, unheated air, various modifications may also be used. Vent 678 may include a canister vent valve 680 to adjust a flow of air and vapors between canister 662 and the atmosphere. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 680 may be a solenoid valve wherein opening or closing of the valve is performed via actuation of a canister vent solenoid. In particular, the canister vent valve may be in a normally open position that is closed upon actuation of the canister vent solenoid.

In some examples, a fuel tank isolation valve 685 may be included in conduit 670 such that fuel tank 144 is coupled to canister 662 via the fuel tank isolation valve. During regular engine operation, isolation valve 685 may be kept closed to limit the amount of diurnal or "running loss" vapors directed to canister 662 from fuel tank 144. During refueling operations, and selected purging conditions, isolation valve 685 may be temporarily opened, e.g., for a duration, to direct fuel vapors from the fuel tank 144 to canister 662.

One or more pressure sensors 687 may be coupled to fuel system 140 for providing an estimate of a fuel system (and evaporative emissions system) pressure. In one example, the fuel system pressure, and in some examples evaporative emissions system pressure as well, is indicated by pressure sensor 687, where pressure sensor 687 is a fuel tank pressure transducer (FTPT) coupled to fuel tank 144. While the depicted example shows pressure sensor 687 directly coupled to fuel tank 144, in alternate embodiments, the pressure sensor may be coupled between the fuel tank and canister 662, specifically between the fuel tank 144 and isolation valve 685.

One or more temperature sensors 688 may also be coupled to fuel system 140 for providing an estimate of a fuel system temperature. In one example, the fuel system temperature is a fuel tank temperature, wherein temperature sensor 688 is a fuel tank temperature sensor coupled to fuel tank 144 for estimating a fuel tank temperature. While the depicted example shows temperature sensor 688 directly coupled to fuel tank 144, in alternate embodiments, the temperature sensor may be coupled between the fuel tank and canister 662.

Fuel vapors released from canister 662, for example during a purging operation, may be directed into the engine intake via purge line 679. The flow of vapors along purge line 679 may be regulated by canister purge valve 675. The quantity and rate of vapors directed to the engine may be determined by the duty cycle of an associated canister purge valve solenoid (not shown). As such, the duty cycle of the canister purge valve solenoids may be determined by the vehicle's powertrain control module (PCM), such as controller 153, responsive to engine operating conditions, including, for example, engine speed-load conditions, an air-fuel ratio, a canister load, etc.

Thus, discussed herein, a system for a vehicle comprises a fuel tank and an onboard navigation system. Such a system further comprises a controller with computer readable instructions stored on non-transitory memory that when executed, cause the controller to, in response to a request to refuel the fuel tank, infer an upcoming travel change based at least in part via communication with the onboard navigation system and provide a recommendation to fill the fuel tank with a first fuel to a first fill level for use prior to the travel change, and then to fill the fuel tank with a second fuel to a second fill level for use after the travel change.

For such a system, the system may further comprise a software application for communicating a travel plan to the controller. In such an example, the controller may store further instructions to infer the upcoming travel change based on the travel plan in conjunction with information retrieved from the onboard navigation system.

For such a system, the system may further comprise a route-learning module that operates in conjunction with the onboard navigation system. In such an example, the controller may store further instructions for inferring the upcoming travel change based on a predicted or inferred travel route subsequent to the request to refuel the fuel tank.

For such a system, the controller may store further instructions to estimate an amount of fuel usage prior to the upcoming travel change, and under conditions where the amount of fuel usage is less than a threshold fuel usage amount, provide a different recommendation to fill the fuel tank with the second fuel to a third fill level.

Accordingly, turning now to FIG. 7, a high-level example method 700 is shown for providing refueling recommendations to a driver, also referred to as a vehicle operator, or autonomous controller of a vehicle. The refueling recommendations may be based at least in part on whether a travel change is predicted or inferred such that it may be desirable to use one fuel until the time of the travel change, and then to refill the fuel tank with a different fuel more suited to vehicle operation subsequent to the travel change. By doing so, a more optimal fuel type may be utilized for the different operating conditions before and after the predicted or inferred travel change.

Method 700 will be described with reference to the systems described herein and shown in FIG. 1, FIG. 3, and FIGS. 6A-6B, though it will be appreciated that similar methods may be applied to other systems without departing from the scope of this disclosure. Instructions for carrying out method 700 and the rest of the methods included herein may be executed by a controller, such as controller 153 of FIG. 6A, based on instructions stored in non-transitory memory, and in conjunction with signals received from sensors of the engine system, such as temperature sensors, pressure sensors, fuel level sensor(s), location sensors, and other sensors described in FIG. 1 and/or FIGS. 6A-6B. The controller may employ actuators to alter states of devices in the physical world according to the methods depicted below.

Method 700 begins at 705 and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 710, method 700 includes indicating if refueling is requested. In one example, refueling may be requested via a vehicle operator depressing a refueling button (e.g. 197). In other examples, refueling may be indicated to be requested based on the vehicle operator opening a fuel door, removing a gas cap, etc. However, in other examples refueling may be indicated to be requested based on a fuel level in the fuel tank of the vehicle dropping below a predetermined threshold fuel level. The threshold fuel level may comprise 10% full, or 5% full, 2% full, etc. For example, if while the vehicle is in operation a fuel level stored in the fuel tank drops below the predetermined threshold fuel level, the controller of the vehicle may illuminate a light or other indicator at the vehicle dash alerting the vehicle operator of the request to refuel. In the case of an autonomously operated vehicle, such a request may be communicated to the controller, and the controller may then take appropriate actions to navigate the vehicle to a fuel filling station, for example.

If, at 710, refueling is not indicated to be requested, method 700 may proceed to 715. At 715, method 700 may include maintaining current operating conditions. For example, if the vehicle is in operation, such operation may be maintained without any actions being taken with regard to refueling. Method 700 may then end.

Returning to 710, in response to refueling being requested, method 700 may proceed to 720. At 720, method 700 may include retrieving information pertaining to learned or inputted travel routines. While not explicitly illustrated at 720, step 720 may additionally or alternatively include retrieving information pertaining to driver habits, driver preferences, etc. For example, as mentioned above driver habits may in some examples be learned via the controller over time in conjunction with the route learning module, and may pertain to how frequently the vehicle operator makes use of maximum engine capability (e.g. habits related to acceleration), frequency of boost usage, frequency with which the vehicle tows a trailer, learned behaviors related to cargo load (e.g. days of week when the vehicle is heavily loaded), learned operator preference for particular fuel, etc.

While the above description pertained to driver habits/preferences learned over time, in other examples such information may be communicated to the controller via operator input into the operator app and/or operator input via the touch screen associated with the instrument panel. Driver preferences may be related to preference for fuel economy over performance or vice versa, preference for cost savings, preference for reduced emissions, etc.

In another example, the vehicle operator may input particular days and/or times where a trailer is planned to be attached or is regularly attached. In yet another example, the vehicle operator may input information pertaining to cargo load (e.g. approximate weight), for example particular days and/or times where cargo load is expected to be greater than usual.

With regard to learned travel routines, the controller may retrieve information related to an expected or predicted upcoming travel route or routes. The expected or predicted upcoming travel routine may include expected or predicted travel routines for a 24 hour period in some examples, or less than 24 hours such as 12 hours, 6 hours, 3 hours, 2 hours, 1 hour, etc. In some examples, the expected or predicted upcoming travel routines may comprise expected or predicted travel over the course of more than 24 hours, for example 2 days, 3 days, 4 days, one week, etc. With regard to inputted travel routines, it may be understood that such information may be input via the vehicle operator into one or more of the onboard navigation system (e.g. navigation system 132 at FIG. 6A), into the operator app (e.g. operator app 615 at FIG. 6A) stored on the operator device (e.g. operator device 610 at FIG. 6A), into the screen associated with the vehicle instrument panel, etc. In some examples, learned/inputted travel routine information may include information pertaining to altitude changes for particular learned or inputted routes, terrain or terrain changes for learned/inputted travel routine information, etc.

It may be understood that information pertaining to learned or inputted travel routines at 720 may not be limited to travel routes, vehicle operator preferences, and/or vehicle operator habits. Information retrieved at 720 may in some examples include current and forecast weather information (e.g. information relating to ambient temperatures, precipitation levels, humidity levels, etc.). In still further examples, information retrieved at 720 may include information stored at a traffic management server (e.g. 235). It may be understood that information pertaining to learned or inputted travel routines may in some examples be used in conjunction with current and forecast weather information and current and upcoming traffic conditions, in order to provide a fueling suggestion or recommendation, discussed in further detail below. In some examples, one or more of the learned or inputted travel routines, current and forecast weather data, current and forecast traffic conditions, altitude changes along a learned or inputted travel routine, terrain along a learned or inputted travel routine, etc., may be used to provide the fueling recommendation.

Taking such information into account, method 700 may proceed to 725. At 725, method 700 may include indicating whether there is a predicted or inferred upcoming travel change that may impact type of fuel and/or amount of fuel to fill the fuel tank with. More specifically, at 725 method 700 may include determining if there is an upcoming travel change such that it may not be desirable to fill the fuel tank to capacity with a particular type of fuel, because shortly thereafter a different fuel type may be more appropriate. Thus, it may be understood that an upcoming travel change may comprise a travel change predicted or inferred to occur in a distance less than the vehicle can travel on a single fuel tank when the single fuel tank is filled to capacity with fuel. In other words, as will be discussed in further detail below, if there is no upcoming travel change predicted or inferred to occur within a distance the vehicle can travel with a full fuel tank, then a single fuel recommendation may be provided to the vehicle operator (or autonomous controller where applicable). However, if there is an upcoming travel change predicted or inferred to occur within a distance that the vehicle can travel on a single fuel tank filled to capacity, then it may be desirable to not fill the fuel tank with a single fuel, but rather to fill the fuel tank with one fuel to a particular amount, and then around the time of the travel change, fill the fuel tank with another fuel to another amount that is based on the travel change. In this way, costs may be optimized (e.g. high octane fuel may not be wasted when not needed), and fuel usage for particular travel conditions may be improved (e.g. higher octane fuel may be used for routes with high speeds, uphill travel, higher cargo loads, uneven terrain, etc., while low or medium octane fuel may be used for less demanding routes with lower engine loads).

Accordingly, as one example, a travel change that may impact fuel choice may comprise a trailer being attached to the vehicle for towing a load. Such information may be directly received by the controller based on vehicle operator input, or may be predicted/inferred based on learned or inputted travel routines. For example, the controller may learn over time that a vehicle operator attaches a trailer to the vehicle on Saturday mornings to tow a boat for fishing trips, whereas for other days of the week the trailer is not used. Such an example is meant to be illustrative. In other examples, the vehicle operator may utilize a trailer during the week for work purposes (e.g. where work comprises landscaping activities, contractor activities, etc.), whereas the trailer is not utilized over the weekend. Again, such an example is meant to be illustrative.

Thus, in the example case where the vehicle operator attaches the trailer on Saturday mornings, it may not be desirable to fill the fuel tank to capacity with a single fuel on Friday morning, due to the predicted or inferred upcoming travel change. In such an example, it may instead be desirable to suggest or recommend that the fuel tank be filled to a particular amount with one fuel for the remainder of Friday's predicted or inferred travel, and then to refuel the fuel tank Saturday morning (or Friday evening when little to no extra travel is expected prior to the upcoming travel change) with a different fuel more appropriate for travel conditions that include an attached trailer.

In another related example, a travel change that may impact fuel choice may include an increased cargo load, where the cargo load comprises passengers or other cargo. For example, the vehicle may be used on particular days for activities which include heavily weighing down the vehicle (e.g. loading gear and/or passengers into a truck for a work job, or loading gear into a vehicle for a recreational activity). Again, such examples are meant to be illustrative.

Additionally or alternatively, a travel change that may impact fuel choice may include a travel routine that includes a substantial amount of higher speed travel (e.g. highway trips) as compared to lower speed travel (e.g. city streets). For example, on certain days of the week (e.g. Friday through Sunday) and times of the year (e.g. summer months between May and August) the vehicle may be used at higher speeds on highways, whereas other days of the week the vehicle is used at lower speeds on city streets. In one example, a travel change that may impact fuel choice may include a threshold amount of higher speed travel. The threshold amount may be based on one or more of average speed for a particular travel routine, percent of time spent above a certain speed for a particular travel routine, etc.

Additionally or alternatively, a travel change that may impact fuel choice may include a travel routine that includes a substantial amount of uphill travel as compared to other travel routines. For example, on certain days of the week (e.g. Saturday) and times of the year (e.g. winter months between November and March) the vehicle may be used to drive up a mountain to a ski resort, whereas other days of the week the vehicle is used at lower altitudes and where driving routines do not include much uphill (or downhill) travel. In one example, a travel change that may impact fuel choice may include a threshold amount of uphill travel. The threshold amount may be based on one or more of total uphill distance for a particular travel routine, altitude change for a particular travel routine, etc.

Additionally or alternatively, a travel change that may impact fuel choice may include a change in weather along a particular travel routine. In one example, the change in weather may be due to changing weather conditions in a particular area (e.g. city). Such an example may include forecasted rain or snow, a forecasted heat wave with high temperatures and low humidity, etc. In other examples, the change in weather may be due to the particular travel routine itself. As an example, a particular travel routine may include a trip from a city with humid, cooler conditions into a desert area with drier (e.g. less humid) and hotter conditions. As another example, a particular travel routine may include a trip from a city with hotter conditions to a higher altitude with cooler conditions.

Additionally or alternatively, a travel change that may impact fuel choice may be a function of current or forecasted traffic conditions. For example, significant congestion or an absence of significant congestion along a particular learned or inputted travel routine may impact an optimal fuel choice for the particular routine. In another example, traffic data retrieved by the controller may indicate a detour route along a particular travel routine, which may impact optimal fuel choice due to changes in driving conditions due to the detour route.

If, at 725, it is indicated that there is not an upcoming travel change inferred to impact fuel choice to a level where it would be desirable to fill the fuel tank to one level with one fuel and then to another level with another fuel, method 700 may proceed to 730. At 730, method 700 may include providing a single fuel recommendation to the vehicle operator or autonomous controller (where applicable). The single fuel recommendation may be based on a set of primary decision factors and a set of secondary decisions factors. For example, the set of primary decision factors may include but are not limited to fuel type specified by the vehicle owner's manual (e.g. diesel fuel, gasoline fuel, minimum octane rating, maximum allowable ethanol content, etc.). The secondary decision factors may be related to the learned or inputted travel routines in conjunction with other information such as current and forecast weather data, current and upcoming traffic conditions, etc. Accordingly, secondary decision factors may include information pertaining to whether the vehicle is towing a trailer and is expected to continue doing so, current and expected vehicle speed, current and expected vehicle load, current and forecasted ambient temperature and/or other weather conditions, driving conditions related to uphill travel, price of different octane fuel types, price of different ethanol fuel types, driver inputted preferences (e.g. fuel economy over performance or vice versa), current and forecasted traffic conditions, etc.

Said another way, because there is not a travel change predicted or inferred to occur within an amount of time or distance that the vehicle will travel on a single fuel tank of fuel, one suggestion of fuel may be provided to the vehicle operator or autonomous controller. While the vehicle operator may not desire, for one reason or another, to fill the fuel tank to capacity, it may be understood that the suggested fuel type may be used to fill the fuel tank to capacity if the vehicle operator desires to do so, without concern that a travel change may occur prior to the fuel in the fuel tank being used up.

The single fuel recommendation may be provided to the vehicle operator via one or more of the screen associated with the vehicle instrument panel, via sending the recommendation to the operator device (e.g. operator device 610 at FIG. 6A) used by the vehicle operator, the operator device running the operator app (e.g. operator app 615 at FIG. 6A) that enables the vehicle operator to view the recommendation, etc. In the case of an autonomous controller, the single fuel recommendation may be stored at the controller, for example. Method 700 may then end.

Returning to 725, in a case where an upcoming travel change is inferred to impact fuel choice, method 700 may proceed to 735. At 735, method 700 may include determining an expected amount of fuel use until the travel change that is inferred to impact fuel choice. The expected amount may be based on learned information similar to that discussed above, operator inputted information, etc. As an example, if the travel change includes attaching a trailer to the vehicle, then based on the information retrieved at step 720, an estimate as to an approximate amount of fuel expected to be used until the travel change occurs may be determined. In another related example, based on the learned or inputted route information, it may be determined that fuel comprising one-third of the capacity of the fuel tank may be used prior to a travel change, the travel change comprising travel up a mountain to a ski resort. Numerous other examples are within the scope of the present disclosure, but for brevity only two examples are provided.

Proceeding to 740, method 700 includes indicating whether the expected amount of fuel use until the travel change is below a threshold fuel usage amount. For example, the methodology of FIG. 7 infers whether a travel change is likely to occur, so that usage of fuel type for particular travel conditions may be optimized. However, it is herein recognized that it may not always be desirable for a vehicle operator to go through the effort of filling the fuel tank of the vehicle with a small amount of fuel, only to have to fill the fuel tank again shortly thereafter with another fuel that is more aligned with the travel change. The threshold fuel usage amount may comprise a predetermined or preset amount (e.g. 30%, 20% of capacity, 15% of capacity, 10% of capacity, 5% of capacity, 2.5% of capacity, etc.) in one example. However, in another example the vehicle operator may set the threshold fuel usage amount. The vehicle operator may set the threshold fuel usage amount via the touch screen associated with the vehicle instrument panel, via the operator app communicatively coupled to the controller, etc. The ability to set the threshold fuel usage amount may enable method 700 to cater to different desires of vehicle operators. For example, a vehicle operator that is budget conscious may set the threshold fuel usage amount on the lower end (e.g. 10% of capacity or less), with knowledge that they may have to deal with more frequent visits to a fuel filling station. In another example, a vehicle operator may not be so concerned with budget, and thus may set the threshold fuel usage amount on the higher end (e.g. 30% of capacity, 20% of capacity, etc.).

As an example, at step 735 it may be determined that the expected amount of fuel use until the travel change comprises 18% of the capacity of the fuel tank. If the threshold fuel usage amount is set lower than 18%, for example at 10% capacity, then it may be understood that the recommendation provided to the vehicle operator may include a first fuel for use until the travel change, and then a second fuel for use based on the travel change. In other words, in such a case the vehicle operator may be fine with filling the fuel tank to around 18% with the first fuel, and then having to stop at another fuel filling station after that fuel is used up (or nearly so), to fill the fuel tank with the second fuel. However, if the expected fuel amount were 10% or less rather than 18%, the vehicle operator may prefer to simply refuel with the second fuel corresponding to the travel change rather than make another trip to a fuel filling station, even though non-optimal fuel may be used until the travel change.

Accordingly, if at 740 the expected amount of fuel use is not lower than the threshold fuel usage amount, method 700 may proceed to 745. At 745, method 700 may include providing a recommendation to fill the fuel tank with a first fuel to a first fill level, and then around the time of the travel change (e.g. within a predetermined distance of the travel change, within a predetermined time of the travel change, etc.) fill the fuel tank with a second fuel to a second fill level. Similar to that discussed above at 730, the recommendation of the first fuel and the second fuel may be a function of primary and secondary decision factors. It may be understood that the first fuel may comprise an optimal or desirable fuel for use by the vehicle until the travel change, whereas the second fuel may comprise an optimal or desirable fuel for use by the vehicle after the travel change. Furthermore, the first fill level may comprise an amount of fuel for use by the vehicle until the travel change, such that at the time of the travel change fuel level in the fuel tank may be below a threshold fuel level (e.g. 5% full or less). In other words, the first fill level may be such that there may not be a significant amount of fuel remaining in the tank at the time of the travel change, such that dilution of the second fuel by the first fuel may be minimal or reduced as much as possible. Likewise, the second fill level may comprise an amount of fuel for use by the vehicle after the travel change, but may also be based on a prediction or estimation of when it may be desirable to stop using the second fuel. In other words, the fuel tank may not be filled with the second fuel to capacity in some examples, but the second fill level may similarly be based on an expected or predicted amount of the second fuel which will be used.

The recommendation or suggestion of the first and second fuel (and amounts of each) may be provided to the vehicle operator via the screen associated with the vehicle instrument panel in one example. In another example, the recommendation may be provided to the vehicle operator via the operator app stored on the operator device used by the vehicle operator. In the case of an autonomous vehicle, the recommendation may be stored at the controller. The recommendation or suggestion of first and second fuels (and amounts of each) may further include locations of one or more fuel filling stations where the vehicle may be refueled with one or both of the first fuel and the second fuel. For example, the locations may be prioritized by proximity to the vehicle along the predicted or inferred travel route and may in some examples be a function of fuel cost. The recommendation may further include directions to the one or more fuel filling stations in some examples. Method 700 may then end.

While not explicitly illustrated, it may be understood that in some examples one or more alerts may be scheduled for communicating to the vehicle operator when it is time to fill the fuel tank with the second fuel. The one or more alerts may similarly be communicated to the vehicle operator via the screen associated with the vehicle instrument panel, via the operator app running on the operator device, etc. In some examples the one or more alerts may be audible alerts. As an example, after the vehicle fuel tank has been filled with the first fuel to the first fill level and while the vehicle is in operation, an alert may be used to communicate to the vehicle operator that time is nearing to fill the fuel tank with the second fuel to the second fill level. Such an alert may include an indication of the nearest fuel filling station along with directions thereto in some examples, similar to that discussed above.

Returning to 740, in a situation where the expected amount of fuel use until the travel change is less than the threshold fuel amount, method 700 may proceed to 750. At 750, method 700 may include recommending adding the second fuel to the fuel tank to a third fill level. Similar to that discussed above at 745, the recommendation may be provided to the vehicle operator via the screen associated with the vehicle instrument panel in one example. In another example, the recommendation may be provided to the vehicle operator via the operator app stored on the operator device used by the vehicle operator. In the case of an autonomous vehicle, the recommendation may be stored at the controller. It may be understood that the third fill level may be greater than either of the first fill level or the second fill level. In other words, because the expected amount of fuel usage until the travel change is below the threshold fuel amount, rather than adding the first fuel to the first amount and then having to find another fuel filling station to then add the second fuel to the second amount, the recommendation may be to simply add the second fuel to an amount whereby the vehicle can be driven to up to the travel change and then during the travel change. In some examples the third fill level may comprise a capacity of the fuel tank, whereas in other examples the third fill level may comprise less than the capacity of the fuel tank. Method 700 may then end.

Turning now to FIG. 8, an example timeline 800 for providing fueling recommendations for a vehicle based on an inferred upcoming travel change according to the method of FIG. 7, is shown. Timeline 800 includes plot 805, indicating whether refueling is requested (yes or no), over time. Timeline 800 further includes plot 810, indicating whether an upcoming travel change is predicted or inferred (yes, no, or n/a), over time. Timeline 800 further includes plot 815, indicating expected fuel use 816 until the travel change. Timeline 800 further includes plot 820, indicating a fuel level in the fuel tank of the vehicle, over time. Fuel level may be empty, full (e.g. at capacity), or somewhere in between. Timeline 800 further includes plot 825, indicating fuel type in the fuel tank, over time. In this example timeline, fuel type may be one of a first type or a second type. Timeline 800 further includes plot 830, indicating whether an alert has been provided to an operator of the vehicle pertaining to the travel change, over time. Thus, it may be understood that in this example timeline the vehicle is being driven by a vehicle operator or driver, rather than being autonomously controlled.

At time t0, refueling is not requested (plot 805), and thus whether or not an upcoming travel change is predicted or inferred is not currently applicable (n/a) (plot 810). Along similar lines, there is no current information being provided with respect to expected fuel use (plot 815) until a travel change, as refueling is not yet being requested. Fuel level in the fuel tank is nearing empty (plot 820), and the type of fuel in the tank comprises the first fuel type. For this example timeline is may be understood that the first fuel type comprises a low octane fuel as compared to a medium or high octane fuel. Furthermore, no alerts are being provided with regard to refueling at time t0 (plot 830).

At time t1, refueling is requested, as fuel level in the fuel tank has dropped below a fuel level threshold (depicted by line 821). It may be understood that the fuel level threshold may comprise a fuel level of 5% capacity in this example timeline. As discussed above, in some examples refueling may be requested simply by the fuel level dropping below the threshold. However, in this example timeline it may be understood that refueling is being requested via the vehicle operator depressing a refueling button associated with the vehicle dash (e.g. refueling button 197 at FIG. 1). In response to the refueling request at time t1, while not explicitly illustrated it may be understood that the vehicle controller assesses whether an upcoming travel change is predicted or inferred which may impact a type of fuel and amount of fuel to add to the fuel tank. More specifically, it may be assessed as to whether an upcoming travel change is predicted or inferred to occur prior to the fuel tank becoming less than the fuel level threshold if the fuel tank were filled to capacity. For example, the controller may assess whether information input into the operator app (e.g. operator app 615 at FIG. 6A), input via interaction with the screen (e.g. touch screen) associated with the vehicle instrument panel, and/or input into the onboard navigation system indicates an upcoming travel change such that it may be desirable to not fill the fuel tank to capacity with the first fuel, but rather partially fill the fuel tank with the first fuel such that the second fuel may be added near the time of the travel change. Additionally or alternatively, the controller may retrieve information pertaining to learned travel routes, learned information related to engine load (e.g. learned times when a trailer is attached, when cargo load is significantly increased, etc.), for assessing a potential upcoming travel change which may impact choice of fuel type. Additionally or alternatively, the controller may retrieve information pertaining to current and forecast weather conditions along a learned or inputted travel plan or route, for assessing a potential upcoming travel change which may impact choice of fuel type. Additionally or alternatively, the controller may retrieve information pertaining to current and forecast travel conditions along the learned or inputted travel plan or route, for assessing a potential travel change which may impact choice of fuel type.

It may be understood that in order for the controller to determine whether it may be desirable to recommend filling the fuel tank with a first fuel to a first fill level, and then at a later time filling the fuel tank with a second fuel to a second fill level, an estimate of how much fuel may be used until the time of the travel change may be determined. Such a determination may be based on an amount of time between the current refueling event and the upcoming travel change. Based on the amount of time, and further based on learned or inputted travel plans, the estimate of fuel use until the travel change may be inferred.

In this example timeline, based the above-mentioned information, it is determined at time t2 that there is an upcoming travel change which may impact fuel choice and/or amount for the current refueling event. Furthermore, the controller determines that the travel change is estimated to occur a certain time from time t2, as represented by line 811. In other words, the travel change is estimated to occur just after time t9. Based on the estimated time and further based on learned or inputted travel plans, the controller makes a determination as to an expected amount of fuel use until the travel change. In this example timeline, the expected amount of fuel use is depicted by bar plot 816, and is called out by arrow 818, where arrow 818 depicts the first fill level. The expected amount of fuel use may range from none (0) to some amount greater than (+) none. Furthermore, the controller compares the expected amount of fuel use to the threshold fuel usage amount discussed above at step 740 of FIG. 7, and depicted here as line 817. As discussed above, the threshold fuel usage amount may comprise a preset threshold or may be adjustable based on vehicle operator preference. In a case where the expected fuel use until the travel change is lower than the threshold fuel usage amount, it may be understood that the vehicle operator may prefer to simply refuel with the fuel type corresponding to the travel change (e.g. second fuel type), rather than fill the fuel tank with the first fuel type and then have shortly thereafter refuel with the second fuel type. However, in this example timeline, the expected fuel use until the travel change is greater than the threshold fuel usage amount, and thus it may be understood that the vehicle operator may prefer to add the first fuel for use until the time of the travel change, and then add the second fuel such that a more optimal fuel type may be used for vehicle operation corresponding to the travel change.

Accordingly, while not explicitly illustrated, between time t2 and t3 the controller communicates the recommended refueling instructions to the vehicle operator by way of the operator app and/or the screen associated with the vehicle instrument panel. The recommendation includes filling the fuel tank to the first fill level (represented by line 818) with the first fuel type, and then at a later time, filling the fuel tank to a second fill level with the second fuel type.

Accordingly, at time t3, the first fuel is added to the fuel tank and at time t4 the first fill level is reached. While not explicitly illustrated, it may be understood that refueling the fuel tank may include, via the controller, commanding open the fuel tank isolation valve (e.g. valve 685 at FIG. 6B) and commanding open or maintaining open the canister vent valve (e.g. valve 680 at FIG. 6B) to fluidically couple the fuel tank to the canister (e.g. canister 662 at FIG. 6B) and to atmosphere. At time t4 refueling is no longer requested (plot 805), and while not explicitly illustrated, it may be understood that in response to refueling no longer being requested, the fuel tank isolation valve may be commanded closed. Between time t4 and t5, the vehicle is driven, and fuel level in the fuel tank declines. Any plateaus where fuel level does not continue to decline may be understood to comprise times where the vehicle is not in operation.

At time t5, fuel level in the fuel tank crosses the fuel level threshold represented by line 821. Accordingly, an alert is provided to the vehicle operator to indicate that it is time to refuel the fuel tank with the second fuel type. While this example timeline depicts the alert being provided in response to fuel level dropping below the fuel level threshold, in other examples the alert(s) may be provided differently without departing from the scope of this disclosure. For example, a first alert may be provided when fuel level is greater than the fuel level threshold by a first amount, a second alert may be provided when fuel level is greater than the fuel level threshold by a second amount, and a third alert may be provided when fuel level is equal to the fuel level threshold. In such an example, it may be understood that the first amount may be greater than the second amount. In other examples the alert may be provided when it is determined via the controller in conjunction with the onboard navigation system that the vehicle is within a predetermined proximity to a refueling station that is dispensing the second fuel type, and that the vehicle is within a threshold distance or threshold time of the travel change.

Thus, while not explicitly illustrated, the vehicle controller may provide recommendations of refueling stations in response to fuel level crossing the fuel level threshold (or in some examples prior to the fuel level crossing the fuel level threshold). The recommendation may be based on the controller sending a request to potential refueling stations pertaining to fuel type available, current cost of different fuel types, proximity to the vehicle, etc. For example, refueling stations that do not include the second fuel type may be excluded from being a recommended to the vehicle operator, such that the vehicle operator does not navigate to a refueling station that is not currently dispensing the second fuel type. Such a recommendation may be provided in conjunction with information retrieved from the onboard navigation system, for example, and may include providing driving directions to the recommended refueling station. In some examples, the vehicle operator may be able, via the operator app and/or screen associated with the vehicle instrument panel, to select a particular refueling station from the recommended refueling stations, at which point directions may be provided to the vehicle operator.

At time t6, it may be understood that the vehicle arrives at the refueling station and requests refueling (plot 805) by depressing the refueling button on the vehicle dash. Similar to that discussed above, the controller may assess whether an upcoming travel change may impact a decision of how much fuel of the second fuel type to add to the fuel tank. For example, if engine load is only expected to increase due to a trailer being attached for a short time, then it may not be desirable to fill the fuel tank to capacity with the second fuel type. However, in this example timeline it may be understood that the travel change includes a trailer being attached to the vehicle for towing a boat for a considerable distance, such that it may be desirable to fill the fuel tank to capacity with the second fuel type. Accordingly, an upcoming travel change is not indicated (plot 810) at time t7.

Accordingly, at time t8 refueling of the fuel tank commences (plot 820), with the second fuel type being added to the fuel tank (plot 825). In this example timeline, due to the travel change comprising adding a trailer for towing a boat which may considerably increase engine load, it may be understood that the second fuel type comprises a high octane fuel type.

By time t9, the fuel tank has been filled to capacity with the second fuel type, where capacity is represented by line 822. With the fuel tank at capacity with the second fuel type, refueling is no longer requested (plot 805), and after time t9 the vehicle is operated using the second fuel type.

In this way, fuel usage may be more appropriately paired with travel route for vehicles that are part of a fleet. For example, when assigning particular loads (e.g. delivery trucks) and/or assigning routes to particular vehicles, by accounting for current fuel type (e.g. high octane) fuel use may be improved, overall costs may be reduced, and vehicle performance may be improved. Similar methodology may be used for vehicles that are not part of a fleet, based on travel routines that are learned over time or based on information submitted to a controller of such a vehicle. For example, refueling recommendations provided to a driver (or autonomous controller in some examples) may be based on predicted or inferred travel plans, which may improve the way in which vehicles use fuel for different travel conditions.

The technical effect of pairing fuel type with travel routes that are known ahead of time is that vehicle performance may be improved and that usage of higher cost fuel may be avoided when usage of such fuel does not provide any substantial benefit in terms of performance.

The systems and methods described herein may enable one or more systems and one or more methods. In one example, a method comprises obtaining a transportation request; determining a travel route pertaining to the transportation request; and selecting a vehicle from a plurality of available vehicles to provide the transportation request based on a respective relative fuel octane content of fuel stored by each of the available vehicles. In a first example of the method, the method further includes wherein the relative fuel octane content is one of a high octane content, a medium octane content, and a low octane content. A second example of the method optionally includes the first example, and further comprises determining a target fuel octane content for the travel route based on the transportation request; and wherein selecting the vehicle is based on the target fuel octane content. A third example of the method optionally includes any one or more or each of the first through second examples, and further includes wherein selecting the vehicle is further based on a type of vehicle appropriate for the transportation request. A fourth example of the method optionally includes any one or more or each of the first through third examples, and further includes wherein selecting the vehicle is further based on a proximity of the vehicle with respect to the transportation request. A fifth example of the method optionally includes any one or more or each of the first through fourth examples, and further includes wherein determining the travel route further comprises determining one or more of an altitude increase for the travel route and an estimate of vehicle speeds for the travel route; and wherein selecting the vehicle is based on one or more of the altitude increase and the estimate of vehicle speeds. A sixth example of the method optionally includes any one or more or each of the first through fifth examples, and further comprises determining a cargo load for the travel route based on the transportation request, where the cargo load includes one or more of a number of occupants, an estimated weight of luggage, and an estimated weight of a trailer; and wherein selecting the vehicle is further based on the cargo load. A seventh example of the method optionally includes any one or more or each of the first through sixth examples, and further comprises retrieving information from the plurality of available vehicles pertaining to the relative fuel octane content of the fuel stored and a fuel level of the fuel stored by each of the available vehicles; and wherein selecting the vehicle is further based on the fuel level. An eighth example of the method optionally includes any one or more or each of the first through seventh examples, and further includes wherein determining the travel route further comprises retrieving current and forecast weather and traffic conditions along the travel route; and wherein selecting the vehicle is further based on the current and forecast weather and traffic conditions.

Another example of a method comprises providing a refueling recommendation for a vehicle participating in a vehicle-for-hire service, the refueling recommendation based on a transportation request received from a customer and where the refueling recommendation includes a fuel type and a fuel fill amount. In a first example of the method, the method further includes wherein the transportation request includes a starting location and an ending location; and wherein a travel route is determined based on the starting location and the ending location and where the fuel type and fuel fill amount are based on the travel route. A second example of the method optionally includes the first example, and further includes wherein the fuel type and the fuel fill amount are further a function of one or more of a vehicle speed, a number of occupants, a cargo load, an amount of an altitude increase corresponding to the travel route and current and forecast weather conditions and traffic conditions corresponding to the travel route. A third example of the method optionally includes any one or more or each of the first through second examples, and further includes wherein the vehicle-for-hire service is a ride-sharing service or a ride-hailing service; and wherein providing the refueling recommendation includes sending the refueling recommendation to a driver device used by a driver of the vehicle. A fourth example of the method optionally includes any one or more or each of the first through third examples, and further includes wherein the vehicle-for-hire service is the ride-sharing service or the ride-hailing service but where the vehicle is autonomously operated in the absence of the driver; and wherein providing the refueling recommendation includes sending the refueling recommendation to a controller of the vehicle. A fifth example of the method optionally includes any one or more or each of the first through fourth examples, and further includes wherein the vehicle-for-hire service is a vehicle-sharing service; and wherein providing the refueling recommendation further comprises sending the refueling recommendation to a customer device used by a customer that submitted the transportation request. A sixth example of the method optionally includes any one or more or each of the first through fifth examples, and further includes wherein the refueling recommendation further includes instructions pertaining to a location of a fuel filling station that is dispensing the fuel type and driving directions to the location of the fuel filling station.

An example of a system for a vehicle comprises a fuel tank; an onboard navigation system; and a controller with computer readable instructions stored on non-transitory memory that when executed, cause the controller to: in response to a request to refuel the fuel tank, infer an upcoming travel change based at least in part via communication with the onboard navigation system; and provide a recommendation to fill the fuel tank with a first fuel to a first fill level for use prior to the travel change, and then to fill the fuel tank with a second fuel to a second fill level for use after the travel change. In a first example of the system, the system further comprises a software application for communicating a travel plan to the controller; and wherein the controller stores further instructions to infer the upcoming travel change based on the travel plan in conjunction with information retrieved from the onboard navigation system. A second example of the system optionally includes the first example, and further comprises a route-learning module that operates in conjunction with the onboard navigation system; and wherein the controller stores further instructions for inferring the upcoming travel change based on a predicted or inferred travel route subsequent to the request to refuel the fuel tank. A third example of the system optionally includes any one or more or each of the first through second examples, and further includes wherein the controller stores further instructions to estimate an amount of fuel usage prior to the upcoming travel change, and under conditions where the amount of fuel usage is less than a threshold fuel usage amount, provide a different recommendation to fill the fuel tank with the second fuel to a third fill level.

In another representation, a method comprises via a software application, receiving a transportation request, determining a travel route based on the transportation request, determining an optimal fuel type for the travel route, and sending a refueling recommendation to a vehicle that is available to fulfill the transportation request. In such a method, the vehicle that is available is selected from a plurality of available vehicles, where the plurality of available vehicles are not currently storing the optimal fuel type. In such a method, the vehicle that is available has a fuel level lower than a threshold fuel level. In such a method, the refueling recommendation includes a fuel octane content, and a fuel fill amount.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method executable by a fleet management system, the method comprising:
   obtaining, at the fleet management system, a transportation request including a starting location and ending location, the transportation request received from a customer device;
   determining, via instructions stored in memory and executed by a processor of the fleet management system, a travel route pertaining to the transportation request, wherein the travel route is determined based on real-time traffic information, forecasted traffic information, and current and forecasted weather/environmental conditions;
   determining, via instructions stored in memory and executed by the processor of the fleet management system, an estimated engine load over the travel route based on the travel route;
   identifying, via instructions stored in memory and executed by the processor of the fleet management system, a plurality of available vehicles, including retrieving a current location and a current status of each vehicle of a fleet of vehicles and excluding any vehicles from the fleet of vehicles from being included in the plurality of available vehicles that are located outside a threshold distance from the starting location;

retrieving, with the fleet management system, fuel information from the plurality of available vehicles pertaining to a respective relative fuel octane content of fuel stored by each of the available vehicles, the fuel information obtained from the plurality of available vehicles via a communication network;

selecting, via the instructions stored in memory and executed by the processor of the fleet management system, a vehicle from the plurality of available vehicles to provide the transportation request based on the respective relative fuel octane content of fuel stored by each of the available vehicles, the estimated engine load, and a fuel level of the fuel stored by each of the available vehicles;

determining, via the instructions stored in memory and executed by the processor of the fleet management system, that the selected vehicle needs to be refueled;

sending, with the fleet management system and over the communication network, instructions pertaining to the transportation request to a controller of the selected vehicle or to a user via an app, wherein the instructions pertaining to the transportation request include refueling instructions comprising a fuel type and an amount of fuel to satisfy the transportation request; and sending, with the fleet management system and over the communication network, an update to the customer device, the update including a real-time current location of the selected vehicle and an estimated time of arrival of the selected vehicle.

2. The method of claim 1, wherein the relative fuel octane content is one of a high octane content, a medium octane content, and a low octane content, the method further comprising determining, via the instructions stored in memory and executed by the processor of the fleet management system, a target fuel octane content for the travel route based on the estimated engine load; and wherein the refueling instructions comprise instructions to refuel with fuel having the target fuel octane content.

3. The method of claim 2, wherein selecting the vehicle from the plurality of available vehicles to provide the transportation request based on the respective relative fuel octane content of fuel stored by each of the available vehicles, the estimated engine load, and the fuel level of the fuel stored by each of the available vehicles comprises determining that none of the plurality of available vehicles is currently storing fuel having the target fuel octane content based on the retrieved respective relative fuel octane content of fuel stored by each of the available vehicles, and in response, selecting the vehicle based on a fuel level of the vehicle being below a threshold level that indicates the vehicle needs to be refueled.

4. The method of claim 2,
wherein the estimated engine load includes an engine load above a first threshold, wherein the target fuel octane content includes the high octane content, and wherein the selected vehicle is determined to be storing fuel having the high octane content.

5. The method of claim 1, wherein determining the travel route further comprises determining one or more of an altitude increase for the travel route and an estimate of vehicle speeds for the travel route; and
wherein selecting the vehicle is based on one or more of the altitude increase and the estimate of vehicle speeds.

6. The method of claim 1, further comprising determining a cargo load for the travel route based on the transportation request, where the cargo load includes one or more of a number of occupants, an estimated weight of luggage, and an estimated weight of a trailer; and
wherein selecting the vehicle is further based on the cargo load.

7. The method of claim 1, wherein selecting the vehicle is further based on a type of vehicle appropriate for the transportation request, and wherein selecting the vehicle is further based on a proximity of the vehicle with respect to the transportation request.

8. A method for a fleet management system, the method comprising:
obtaining, with the fleet management system, a transportation request, wherein the transportation request includes a starting location and an ending location, and further includes selection of a green option indicating a preference for reduced emissions;

determining, by a processor executing instructions stored in memory of the fleet management system, a travel route pertaining to the transportation request, wherein the travel route is determined based on the starting location and the ending location and further based at least in part on real-time traffic information;

retrieving, with the fleet management system, fuel information from a plurality of available vehicles participating in a vehicle-for-hire service pertaining to a respective relative fuel octane content of fuel stored by each of the available vehicles and a fuel level of each of the available vehicles, the fuel information obtained from the plurality of available vehicles via a communication network;

selecting, with the processor executing the instructions, a vehicle from the plurality of available vehicles to provide the transportation request based on the respective relative fuel octane content of fuel stored by each of the available vehicles and the travel route, including determining a target fuel octane content for the travel route, determining that none of the plurality of available vehicles is currently storing fuel having the target fuel octane content based on the retrieved respective relative fuel octane content of fuel stored by each of the available vehicles, and in response, selecting the vehicle based on a fuel level of the vehicle; and providing, with the fleet management system, instructions pertaining to the transportation request and a refueling recommendation for the vehicle to a controller of the vehicle or to a user via an app, where the refueling recommendation includes a fuel type and a fuel fill amount, wherein the fuel type and the fuel fill amount are each based on the travel route, wherein the travel route is matched with a vehicle with the fuel type that is in line with the customer preference for fuel economy, and wherein the refueling recommendation further includes instructions pertaining to a location of a fuel filling station that is dispensing the fuel type and driving directions to the location of the fuel filling station, wherein selecting the vehicle based on the fuel level of the vehicle includes selecting the vehicle in response to the fuel level of the vehicle being below a threshold level, and wherein the fuel type includes fuel having the target fuel octane content.

9. The method of claim 8, wherein the fuel type and the fuel fill amount are further a function of one or more of a vehicle speed, a number of occupants, a cargo load, an amount of an altitude increase corresponding to the travel route and current and forecast weather conditions and traffic conditions corresponding to the travel route.

10. The method of claim 8, wherein the vehicle-for-hire service is a ride-sharing service or a ride-hailing service; and
wherein providing the refueling recommendation for the vehicle to the controller of the vehicle or to the user via the app includes sending the refueling recommendation to a driver device executing the app and used by the user, where the user is a driver of the vehicle.

11. The method of claim 10, wherein the vehicle-for-hire service is the ride-sharing service or the ride-hailing service but where the vehicle is autonomously operated in the absence of the driver; and
wherein providing the refueling recommendation for the vehicle to the controller of the vehicle or to the user via the app includes sending the refueling recommendation to the controller of the vehicle.

12. The method of claim 8, wherein the vehicle-for-hire service is a vehicle-sharing service; and
wherein providing the refueling recommendation further comprises sending the refueling recommendation to the user via the app executing on a customer device used by the user, where the user is a customer that submitted the transportation request.

13. The method of claim 8, wherein selecting the vehicle is further based on a type of vehicle appropriate for the transportation request.

14. The method of claim 8, wherein selecting the vehicle is further based on a proximity of the vehicle with respect to the transportation request.

15. A system for a vehicle, comprising:
a fuel tank;
an onboard navigation system;
a controller with first computer readable instructions stored on a first non-transitory memory that when executed, cause the controller to:
in response to a request to refuel the fuel tank, infer an upcoming travel change based at least in part via communication with the onboard navigation system, the upcoming travel change inferred based on learned or inputted travel routines, current and forecast weather data, current and forecast traffic conditions, altitude changes along the learned or inputted travel routine, and terrain along the learned or inputted travel routine, and wherein the upcoming travel change is predicted to occur within a distance that the vehicle can travel on the fuel tank filled to capacity; and
provide a recommendation to fill the fuel tank at a first refueling event with a first fuel to a first fill level for use prior to the travel change, and then to fill the fuel tank at a second, later refueling event with a second fuel to a second fill level for use after the travel change; and
a fleet management system with second computer readable instructions stored on a second non-transitory memory that when executed, cause the fleet management system to:
provide a transportation request and a refueling recommendation for the vehicle to the controller of the vehicle or to the user via an app, where the refueling recommendation includes a fuel type and a fuel fill amount, wherein the fuel type and the fuel fill amount are each based on a travel route, wherein the travel route is matched with the vehicle with the fuel type that is in line with a customer preference for fuel economy, and wherein the refueling recommendation further includes instructions pertaining to a location of a fuel filling station that is dispensing the fuel type and driving directions to the location of the fuel filling station, wherein selecting the vehicle based on the fuel level of the vehicle includes selecting the vehicle in response to the fuel level of the vehicle being below a first threshold level, and wherein the fuel type includes fuel having the target fuel octane content.

16. The system of claim 15, further comprising:
a software application for communicating a travel plan to the controller; and
wherein the controller stores further instructions to infer the upcoming travel change based on the travel plan in conjunction with information retrieved from the onboard navigation system, and wherein the first fuel is different than the second fuel.

17. The system of claim 15, further comprising:
a route-learning module that operates in conjunction with the onboard navigation system;
wherein the controller stores further instructions for inferring the upcoming travel change based on a predicted or inferred travel route subsequent to the request to refuel the fuel tank; and
wherein providing the recommendation to fill the fuel tank at a first refueling event with the first fuel to the first fill level for use prior to the travel change, and then to fill the fuel tank at a second, later refueling event with the second fuel to the second fill level for use after the travel change comprises:
providing a first recommendation to fill the fuel tank with the first fuel to the first fill level; and
after the fuel tank has been filled with the first fuel, determining that a fuel level of the fuel tank is below a second threshold level or that the vehicle is within a predetermined distance of the travel change, and in response, providing a second recommendation to fill the fuel tank with the second fuel to the second fill level.

18. The system of claim 15, wherein the controller stores further instructions to estimate an amount of fuel usage prior to the upcoming travel change, and under conditions where the amount of fuel usage is less than a threshold fuel usage amount, provide a different recommendation to fill the fuel tank with the second fuel to a third fill level.

* * * * *